(12) United States Patent
Kosmicki et al.

(10) Patent No.: US 11,105,343 B2
(45) Date of Patent: Aug. 31, 2021

(54) FLUID-FOIL IMPELLER AND METHOD OF USE

(71) Applicants: Robert J. Kosmicki, Papillion, NE (US); Perry D. Smith, Logan, IA (US); Jacob B. Smith, Plattsmouth, NE (US); Julianne S. Smith, Plattsmouth, NE (US)

(72) Inventors: Robert J. Kosmicki, Papillion, NE (US); Perry D. Smith, Logan, IA (US); Jacob B. Smith, Plattsmouth, NE (US); Julianne S. Smith, Plattsmouth, NE (US)

(73) Assignee: Smith Flow Dynamics, LLC, Papillion, NE (US)

( * ) Notice: Subject to any disclaimer, the term of this patent is extended or adjusted under 35 U.S.C. 154(b) by 79 days.

(21) Appl. No.: 16/716,434

(22) Filed: Dec. 16, 2019

(65) Prior Publication Data

US 2020/0191168 A1 Jun. 18, 2020

Related U.S. Application Data

(63) Continuation-in-part of application No. 29/673,448, filed on Dec. 14, 2018, now Pat. No. Des. 918,142.
(Continued)

(51) Int. Cl.
*F04D 29/66* (2006.01)
*F04D 17/16* (2006.01)
(Continued)

(52) U.S. Cl.
CPC ........... *F04D 29/666* (2013.01); *F04D 5/001* (2013.01); *F04D 17/161* (2013.01);
(Continued)

(58) Field of Classification Search
None
See application file for complete search history.

(56) References Cited

U.S. PATENT DOCUMENTS

| 1,061,206 | A | 5/1913 | Tesla |
| 1,329,559 | A | 2/1920 | Tesla |

(Continued)

FOREIGN PATENT DOCUMENTS

| CN | 202851255 U | 4/2013 |
| EP | 2592 A1 | 6/1979 |
| GB | 2512562 A | 10/2014 |

*Primary Examiner* — Michael Lebentritt
(74) *Attorney, Agent, or Firm* — Luke C. Holst; McGrath North Mullin & Kratz, PC LLO

(57) ABSTRACT

The present invention relates in general to the field of fluid reaction surfaces, and more specifically, to a fluid-foil impeller and method of use. One aspect of the fluid-foil impeller utilizes a plurality of fluid-foil discs that may be of uniform and/or variable thickness and configured to rotate rapidly in series to produce propulsion. Each fluid-foil disc comprises a leading edge, a trailing edge, a chord and a fixed pitch. The fluid-foil impeller may further include a standard or Venturi shroud that is designed to encompass the plurality of fluid-foil discs. The plurality of fluid-foil discs are configured to act in cooperation with the shroud to reduce losses incurred from turbulence and the conversion of mechanical work to fluid movement. Fluid may be acted upon by the plurality of fluid-foil discs and/or shroud, singly or in an array. A purpose of the invention is to provide a fluid-foil impeller and method of use that reduces harmful cavitation effects typically encountered by traditional propeller blades when operating at high revolutions per minute. An additional purpose of the invention is to provide a fluid-foil impeller that may be used efficiently and safely in a variety of industrial applications that requires successful propulsion a fluid.

20 Claims, 19 Drawing Sheets

Related U.S. Application Data

(60) Provisional application No. 62/779,599, filed on Dec. 14, 2018.

(51) Int. Cl.
    *F04D 5/00*           (2006.01)
    *F04D 29/28*         (2006.01)
    *F01D 5/14*          (2006.01)

(52) U.S. Cl.
    CPC ............ *F04D 29/281* (2013.01); *F01D 5/147* (2013.01); *F05B 2240/14* (2013.01); *F05B 2240/301* (2013.01)

(56) References Cited

U.S. PATENT DOCUMENTS

| | | | | |
|---|---|---|---|---|
| 2,778,204 | A * | 1/1957 | Frank | F04D 25/166 62/402 |
| 3,017,848 | A | 1/1962 | Bishop | |
| 3,304,714 | A | 2/1967 | Becher | |
| 3,844,113 | A * | 10/1974 | Lockwood, Jr. | F01D 1/36 60/39.15 |
| 4,280,791 | A | 7/1981 | Gawne | |
| 4,344,479 | A * | 8/1982 | Bailey | F22B 7/00 165/109.1 |
| 4,900,480 | A * | 2/1990 | Litz | B01F 3/04531 261/123 |
| 5,192,183 | A | 3/1993 | Wilkinson | |
| 5,297,926 | A * | 3/1994 | Negishi | F04D 5/001 415/198.1 |
| 5,356,600 | A * | 10/1994 | Kiyonaga | B01F 3/04531 422/234 |
| 5,388,958 | A | 2/1995 | Dinh | |
| D371,958 | S | 7/1996 | Keaton | |
| 5,814,222 | A * | 9/1998 | Zelenak | B01F 13/065 210/615 |
| D403,750 | S | 1/1999 | Fabian | |
| 6,158,722 | A * | 12/2000 | Gigas | B01F 3/04539 261/84 |
| D442,675 | S | 5/2001 | Burns | |
| 6,368,078 | B1 | 4/2002 | Palumbo | |
| 6,503,067 | B2 | 1/2003 | Palumbo | |
| 6,682,077 | B1 | 1/2004 | Letourneau | |
| 6,692,232 | B1 | 2/2004 | Letourneau | |
| 6,726,443 | B2 | 4/2004 | Collins et al. | |
| D496,337 | S | 9/2004 | Kaizu | |
| 6,973,792 | B2 | 12/2005 | Hicks | |
| 7,241,106 | B2 | 7/2007 | Avina | |
| 7,244,248 | B2 * | 7/2007 | Azzolini | A61M 5/16827 137/896 |
| D563,328 | S | 3/2008 | Sano | |
| D616,468 | S | 5/2010 | Bossom | |
| 8,801,359 | B2 | 8/2014 | Sherrer | |
| 9,163,512 | B2 | 10/2015 | Bohl et al. | |
| 9,410,426 | B2 | 8/2016 | Beeler | |
| 9,759,067 | B2 | 9/2017 | Tepic | |
| D798,826 | S | 10/2017 | Karlsson | |
| 9,835,142 | B2 | 12/2017 | Bohl et al. | |
| 9,863,557 | B2 | 1/2018 | Haynes | |
| 2005/0214109 | A1* | 9/2005 | Grande, III | F01D 1/36 415/90 |
| 2006/0291997 | A1 | 12/2006 | Wilson | |
| 2007/0092369 | A1 | 4/2007 | Wilson | |
| 2009/0317271 | A1* | 12/2009 | Gill | F04D 29/048 417/420 |
| 2013/0039744 | A1 | 2/2013 | Woody | |
| 2014/0227769 | A1* | 8/2014 | Strobbe | C12N 5/0607 435/287.1 |
| 2015/0330234 | A1 | 11/2015 | Ryker et al. | |
| 2016/0115968 | A1 | 4/2016 | Blackstone | |
| 2017/0051757 | A1* | 2/2017 | Sarmiento | F04D 5/001 |

\* cited by examiner

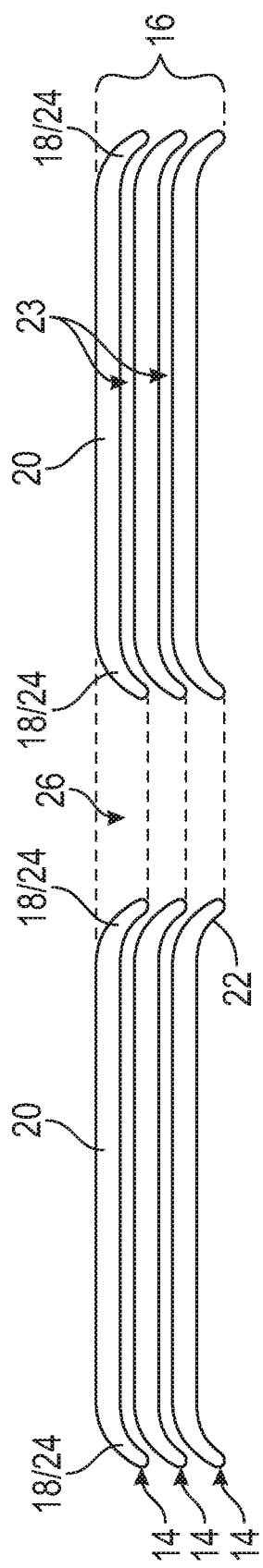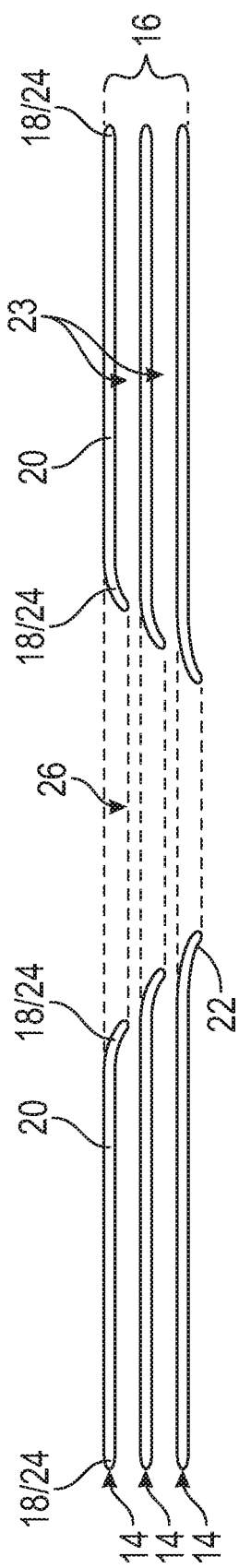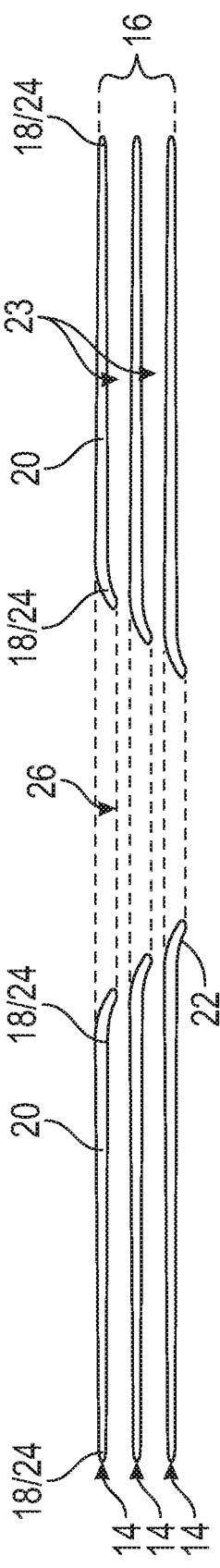

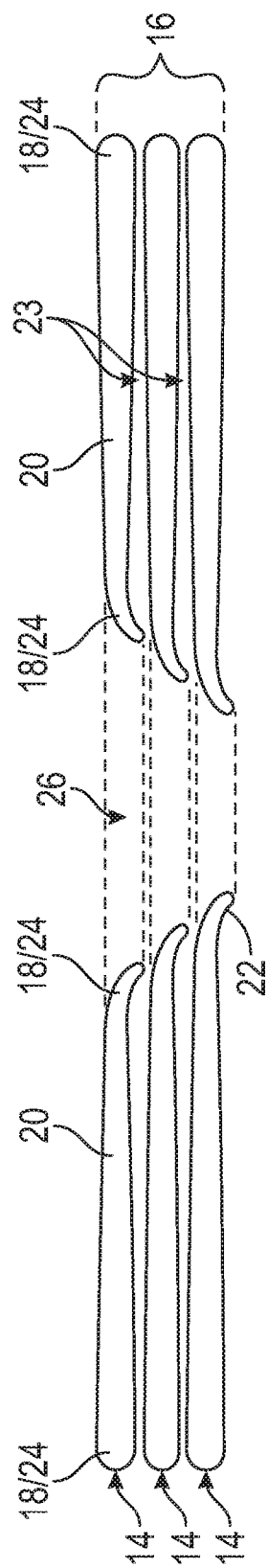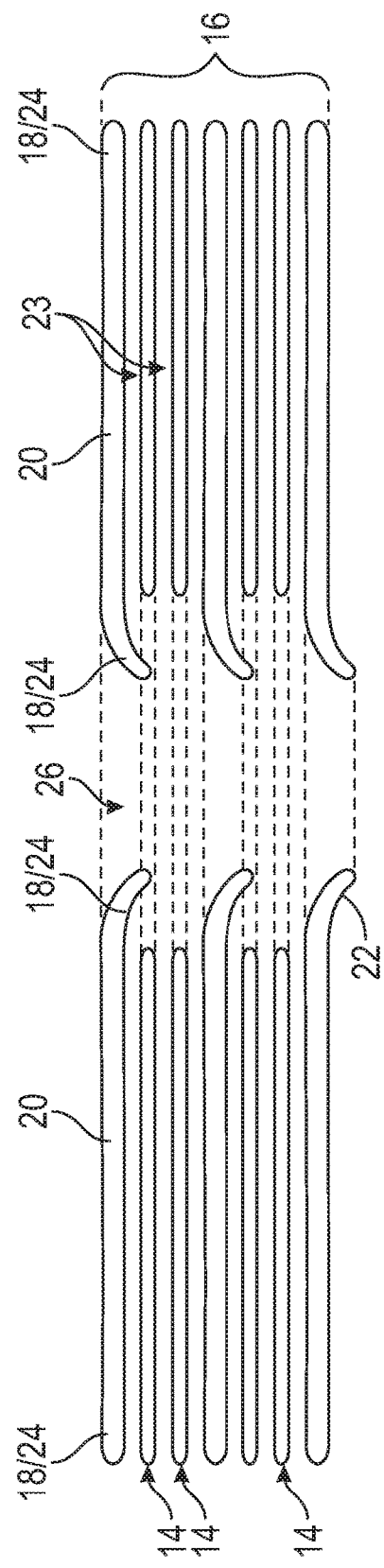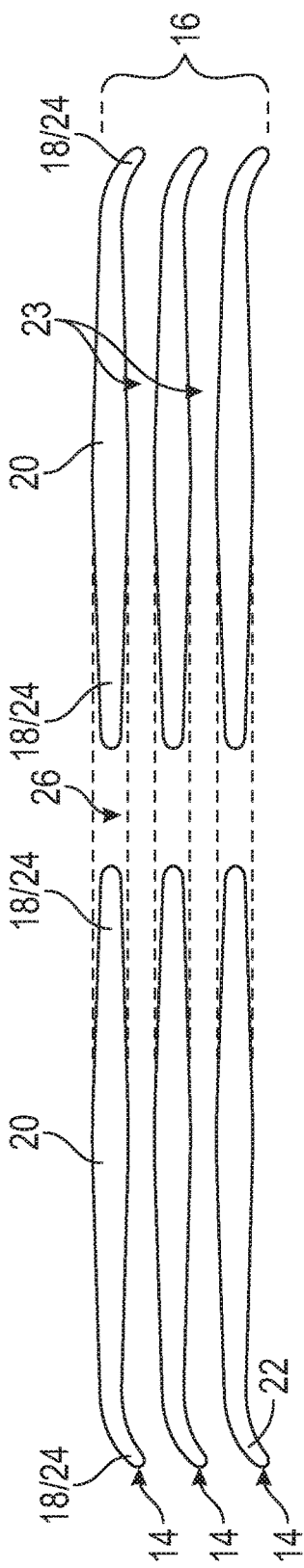

FLUID-FOIL IMPELLER AND METHOD OF USE

CROSS REFERENCE TO RELATED APPLICATIONS

This application claims priority under 35 U.S.C. § 119 to provisional application Ser. No. 62/779,599 filed Dec. 14, 2018 and design application Ser. No. 29/673,448 filed Dec. 14, 2018, herein incorporated by reference in their entirety.

FIELD OF THE INVENTION

The present invention relates in general to the field of fluid reaction surfaces, and more specifically, to a fluid-foil impeller and method of use. The purpose of the invention is to provide an efficient, safe and cost-effective fluid-foil impeller and method of use that can be used in a variety of applications to successfully propel a fluid, vapor, liquid or semi-solid. Another purpose of the invention is to provide a fluid-foil impeller and method of use that mitigates harmful cavitation effects typically encountered by traditional propeller blades when operating at high revolutions per minute ("RPM").

BACKGROUND OF THE INVENTION

Historically there have been many types of fluid reaction surfaces, e.g., screw propellers, jet propulsion, Magnus cylinders, impellers, propulsors and boundary layer turbines. Such traditional impellers create high levels of turbulence due to the sinusoidal nature of fluid flow induced by the physical properties of above listed fluid reaction surfaces, resulting in cavitation and damage to the impeller.

In the early 1900s Ludwig Prandtl discovered the effects of a boundary layer and published a paper detailing his findings, sparking renowned inventor Nikola Tesla's interest. Consequently, Tesla designed and built a turbine based on this technology, commonly known as the "Tesla Turbine." Many attempts have been made since then to resolve technical failures that prevented the Tesla Turbine from becoming the prominent invention originally envisioned. These failures involve turbine housing arrangements, materials of composition, disc profiles, vibrations due to imbalance and turbulence inducing intakes. Thus there is a need for an efficient, safe and cost-effective fluid-foil impeller that improves upon existing fluid reaction surface technology to successfully produce propulsion while mitigating destructive cavitation effects. There is a further need for a fluid-foil impeller that works reliably with different types of fluids across multiple industries.

BRIEF SUMMARY OF THE INVENTION

Therefore, it is a principal object, feature, and/or advantage of the present disclosure to overcome the aforementioned deficiencies in the art and provide a fluid-foil impeller and method of use that addresses the aforementioned limitations of traditional fluid reaction surfaces which include losses incurred from turbulence and the conversion of mechanical work to fluid movement.

An additional object, feature, and/or advantage of the present disclosure is to improve upon existing fluid reaction surface technology by utilizing the internal friction of a "fluid" against a plurality of fluid-foil discs that are configured to rotate rapidly in series to produce propulsion.

Another object, feature, and/or advantage of the present disclosure is to utilize a standard or Venturi shroud that is designed to encompass the plurality of fluid-foil discs. The plurality of fluid-foil discs are configured to act in cooperation with the shroud to further reduce losses incurred from turbulence and the conversion of mechanical work to fluid movement. The fluid may be acted upon by the plurality of fluid-foil discs and/or shroud, singly or in an array.

A further object, feature, and/or advantage of the present disclosure is to utilize a derivative of the boundary layer and the plurality of fluid-foil discs to further reduce losses incurred from turbulence and the conversion of mechanical work to fluid movement.

An additional object, feature, and/or advantage of the present disclosure is to provide a fluid-foil impeller and method of use that is compatible with all types of fluids, including but not limited to water, air, oils, vapors, semi-solids or other types of liquids.

Another object, feature, and/or advantage of the present disclosure is to provide a fluid-foil impeller and method of use that improves the efficiency of traditional propellers by delaying or mitigating harmful cavitation effects that are typically associated with use at high RPMs.

A further object, feature, and/or advantage of the present disclosure is to provide a fluid-foil impeller and method of use that is compatible with all manufacturers, modifications, sizes, formats and alternatives of engines, turbines and motors.

An additional object, feature, and/or advantage of the present disclosure is to provide a fluid-foil impeller and method of use that has industry-wide application in the marine and aeronautical industries, and beyond. For example, application of the present disclosure may also include use in HVAC systems, vacuum pumps, regenerative blowers, grain storage drying systems and cooling fans.

Another object, feature, and/or advantage of the present disclosure is to provide fluid-foil impeller and method of use that is easy to operate, clean and maintain.

A further object, feature, and/or advantage of the present disclosure is to provide a fluid-foil impeller and method of use that is cost-efficient to manufacture and affordable for the everyday consumer.

These and/or other objects, features, and/or advantages of the present disclosure will be apparent to those skilled in the art. The present disclosure is not to be limited to or by these objects, features, and advantages. No single aspect need provide each and every object, feature, or advantage.

According to one aspect of the present disclosure, a fluid-foil impeller is provided. The fluid-foil impeller may comprise a plurality of fluid-foil discs arranged in a series (e.g., array). Each fluid-foil disc may include: a leading edge; a trailing edge; a chord separating the leading edge and the trailing edge; and, a fixed pitch. The fluid-foil impeller may further comprise at least one spacer separating each fluid-foil disc of the plurality of fluid-foil discs arranged in the series, wherein the at least one spacer forms a boundary layer (e.g., gap). At least one structural post may connect the plurality of fluid-foil discs to a carrier. The carrier may be coupled to a drive shaft that is configured to rotate the fluid-foil impeller to propel fluid. The fluid-foil impeller may further include a shroud partially or fully encompassing the fluid-foil impeller, wherein the shroud is configured to expel fluid from the fluid-foil impeller.

According to another aspect of the present disclosure, a method of using a fluid-foil impeller is provided. The method may comprise providing a fluid-foil impeller as described above and using it in an industrial application.

Different aspects may meet different objects of the disclosure. Other objectives and advantages of this disclosure will be more apparent in the following detailed description taken in conjunction with the figures. The present disclosure is not to be limited by or to these objects or aspects. It is to be understood that both the foregoing general description and the following detailed description are exemplary and explanatory only and are not necessarily restrictive of the present disclosure. The accompanying figures, which are incorporated in and constitute a part of the specification, illustrate subject matter of the disclosure. Together, the descriptions and the figures serve to explain the principles of the disclosure.

DESCRIPTION OF FIGURES

FIGS. 1 through 37 represent examples of a fluid-foil impeller of the present disclosure, and a method of using the fluid-foil impeller.

FIG. 1 is a perspective front-top view of a fluid-foil disc for the fluid-foil impeller of the present disclosure, showing a first aspect of a disc profile intended for subsonic velocities.

FIG. 2 is a top plan view of the fluid-foil disc of FIG. 1.

FIG. 3 is a bottom plan view of the fluid-foil disc of FIG. 1.

FIG. 4 is a front-side elevational view of the fluid-foil disc of FIG. 1, the rear-side elevational view, the right-side elevational view and the left-side elevational view being mirror images.

FIG. 5 is a cross-sectional view of the fluid-foil disc of FIG. 2.

FIG. 6 is a perspective view of the fluid-foil impeller of the present disclosure comprising a plurality of the fluid-foil discs of FIG. 1 arranged in a series with a carrier and shroud.

FIG. 7 is a perspective front-top view of a fluid-foil disc for the fluid-foil impeller of the present disclosure, showing a second aspect of the disc profile intended for supersonic velocities.

FIG. 8 is a top plan view of the fluid-foil disc of FIG. 7.

FIG. 9 is a bottom plan view of the fluid-foil disc of FIG. 7.

FIG. 10 is a front-side elevational view of the fluid-foil disc of FIG. 7, the rear-side elevational view, the right-side elevational view and the left-side elevational view being mirror images.

FIG. 11 is a cross-sectional view of the fluid-foil disc of FIG. 8.

FIG. 12 is a perspective view of the fluid-foil impeller of the present disclosure comprising a plurality of the fluid-foil discs of FIG. 7 arranged in a series with a carrier and shroud.

FIG. 13 is a perspective front-top view of a fluid-foil disc for the fluid-foil impeller of the present disclosure, showing a third aspect of the disc profile intended for subsonic velocities.

FIG. 14 is a top plan view of the fluid-foil disc of FIG. 13.

FIG. 15 is a bottom plan view of the fluid-foil disc of FIG. 13.

FIG. 16 is a front-side elevational view of the fluid-foil disc of FIG. 13, the rear-side elevational view, the right-side elevational view and the left-side elevational view being mirror images.

FIG. 17 is a cross-sectional view of the fluid-foil disc of FIG. 14.

FIG. 18 is a perspective view of the fluid-foil impeller of the present disclosure comprising a plurality of the fluid-foil discs of FIG. 13 arranged in a series with a carrier and shroud.

FIG. 19 is a cross-sectional view of a plurality of fluid-foil discs arranged in a series for the fluid-foil impeller of the present disclosure, showing a fourth aspect of the disc profile.

FIG. 20 is a cross-sectional view of a plurality of fluid-foil discs arranged in a series for the fluid-foil impeller of the present disclosure, showing a fifth aspect of the disc profile.

FIG. 21 is a cross-sectional view of a plurality of fluid-foil discs arranged in a series for the fluid-foil impeller of the present disclosure, showing a sixth aspect of the disc profile.

FIG. 22 is a cross-sectional view of a plurality of fluid-foil discs arranged in a series for the fluid-foil impeller of the present disclosure, showing a seventh aspect of the disc profile.

FIG. 23 is a cross-sectional view of a plurality of fluid-foil discs arranged in a series for the fluid-foil impeller of the present disclosure, showing an eighth aspect of the disc profile.

FIG. 24 is a cross-sectional view of a plurality of fluid-foil discs arranged in a series for the fluid-foil impeller of the present disclosure, showing a ninth aspect of the disc profile.

FIG. 25 is a cross-sectional view of a plurality of fluid-foil discs arranged in a series for the fluid-foil impeller of the present disclosure, showing a tenth aspect of the disc profile.

FIG. 26 is a cross-sectional view of a plurality of fluid-foil discs arranged in a series for the fluid-foil impeller of the present disclosure, showing an eleventh aspect of the disc profile.

FIG. 27 is a cross-sectional view of a plurality of fluid-foil discs arranged in a series for the fluid-foil impeller of the present disclosure, showing a twelfth aspect of the disc profile.

FIG. 28 is a cross-sectional view of a plurality of fluid-foil discs arranged in a series for the fluid-foil impeller of the present disclosure, showing a thirteenth aspect of the disc profile.

FIG. 29 is a cross-sectional view of a plurality of fluid-foil discs arranged in a series for the fluid-foil impeller of the present disclosure, showing a fourteenth aspect of the disc profile.

FIG. 30 is a cross-sectional view of a plurality of fluid-foil discs arranged in a series for the fluid-foil impeller of the present disclosure, showing a fifteenth aspect of the disc profile.

FIG. 31 is a cross-sectional view of a plurality of fluid-foil discs arranged in a series for the fluid-foil impeller of the present disclosure, showing a sixteenth aspect of the disc profile.

FIG. 32 is a cross-sectional view of different types of leading and/or trailing edges that may be utilized by the fluid-foil discs of the fluid-foil impeller of the present disclosure.

FIG. 33 is a top plan view of a carrier for the fluid-foil impeller of the present disclosure, the bottom plan view being a mirror image.

FIG. 34 is a front-side cross-sectional view of the carrier of FIG. 19, the rear-side cross-sectional view, the right-side cross-sectional view and the left-side cross-sectional view being mirror images.

FIG. 35 is a front-side cross-sectional view of a first aspect of the fluid-foil impeller of the present disclosure attached the carrier and shroud, the rear-side cross-sectional view, the right-side cross-sectional view and the left-side cross-sectional view being mirror images.

FIG. 36 is a front-side cross-sectional view of a second aspect of the fluid-foil impeller 10 of the present disclosure attached to the carrier and shroud, the rear-side cross-sectional view, the right-side cross-sectional view and the left-side cross-sectional view being mirror images.

FIG. 37 is a front-side cross-sectional view of a third aspect of the fluid-foil impeller of the present disclosure attached to the carrier and shroud, the rear-side cross-sectional view, the right-side cross-sectional view and the left-side cross-sectional view being mirror images.

DETAILED DESCRIPTION OF THE INVENTION

Figure 1:
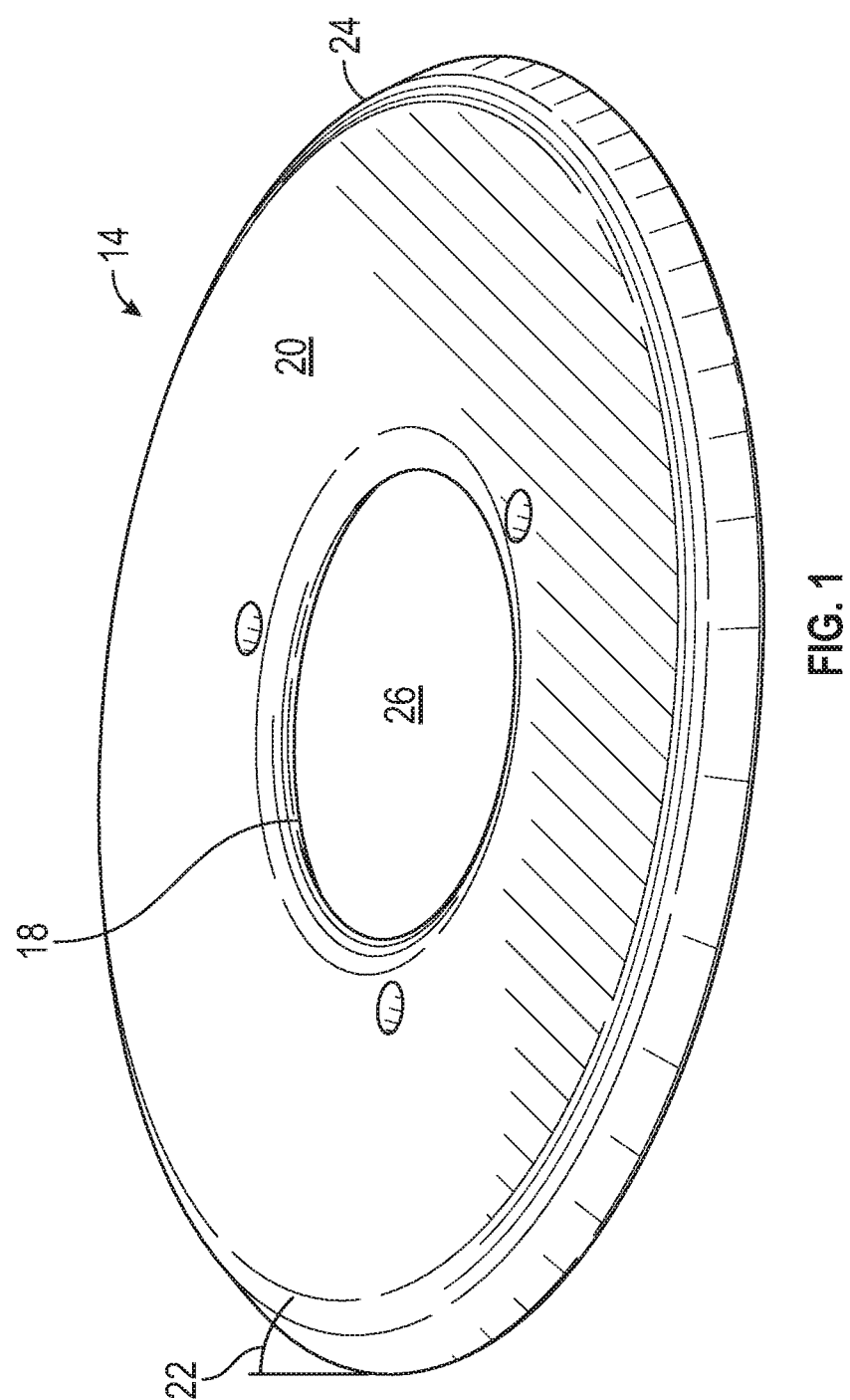
Figure 2:
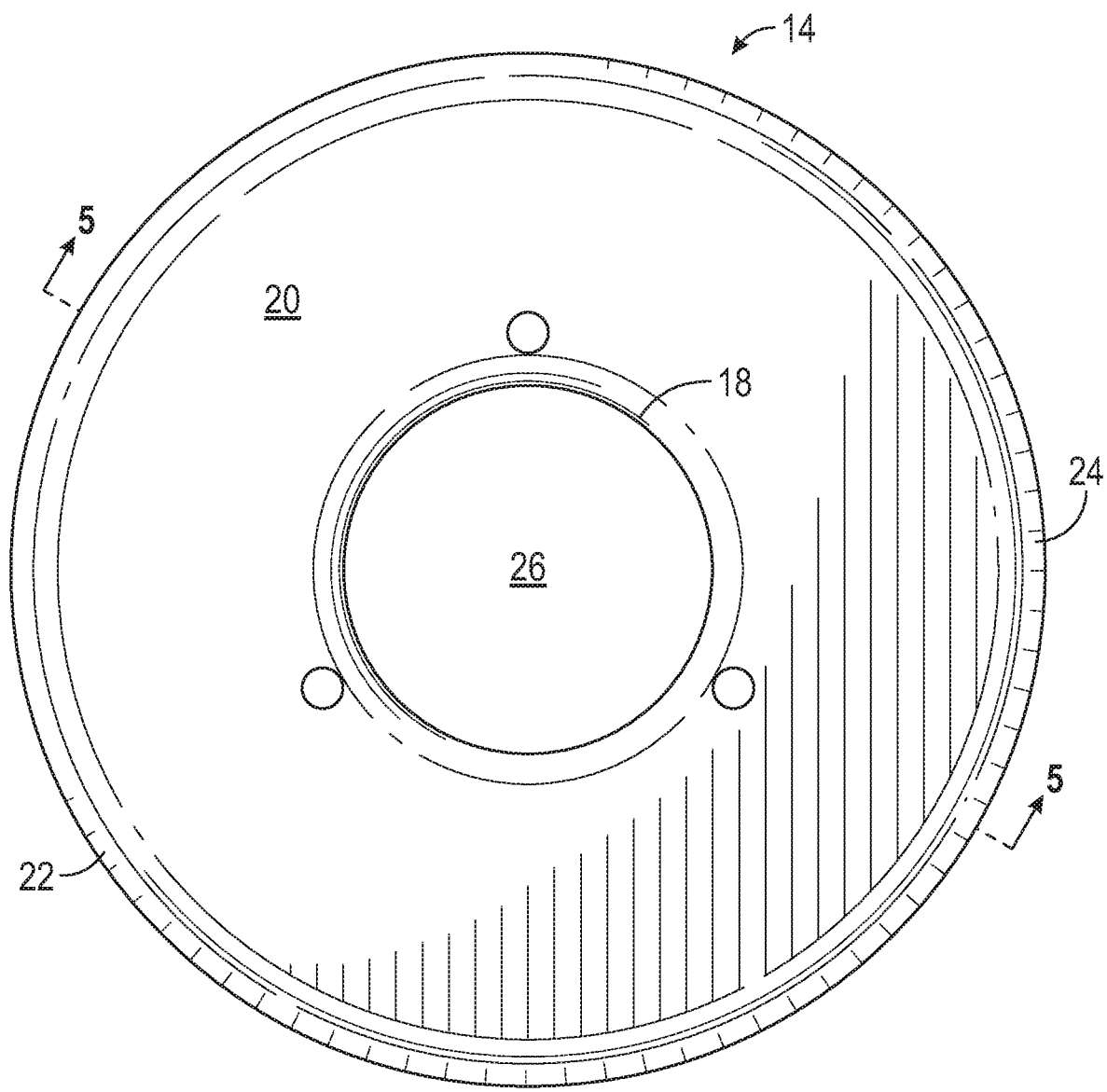
Figure 3:
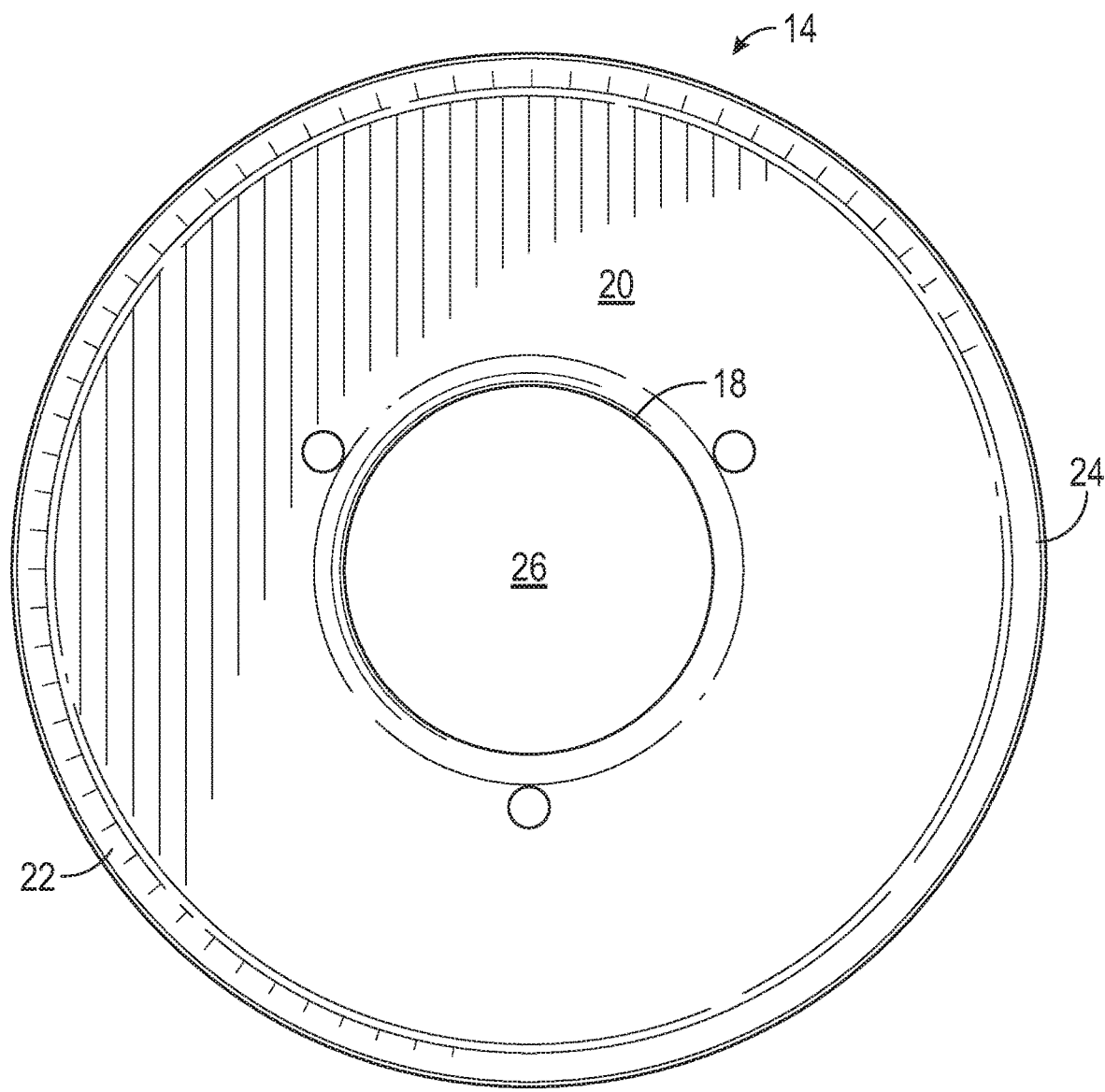
Figure 4:
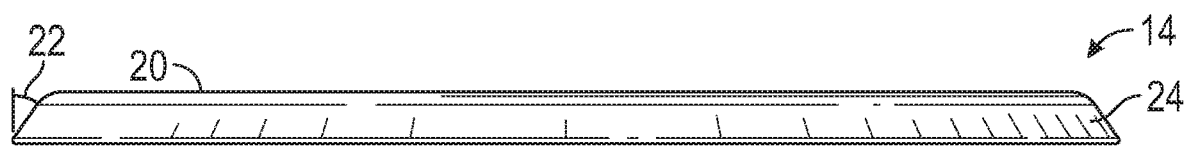
Figure 5:
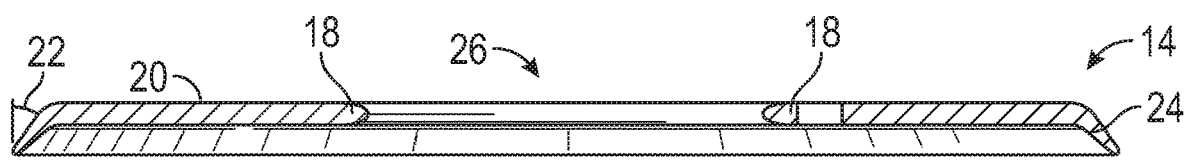
Figure 6:
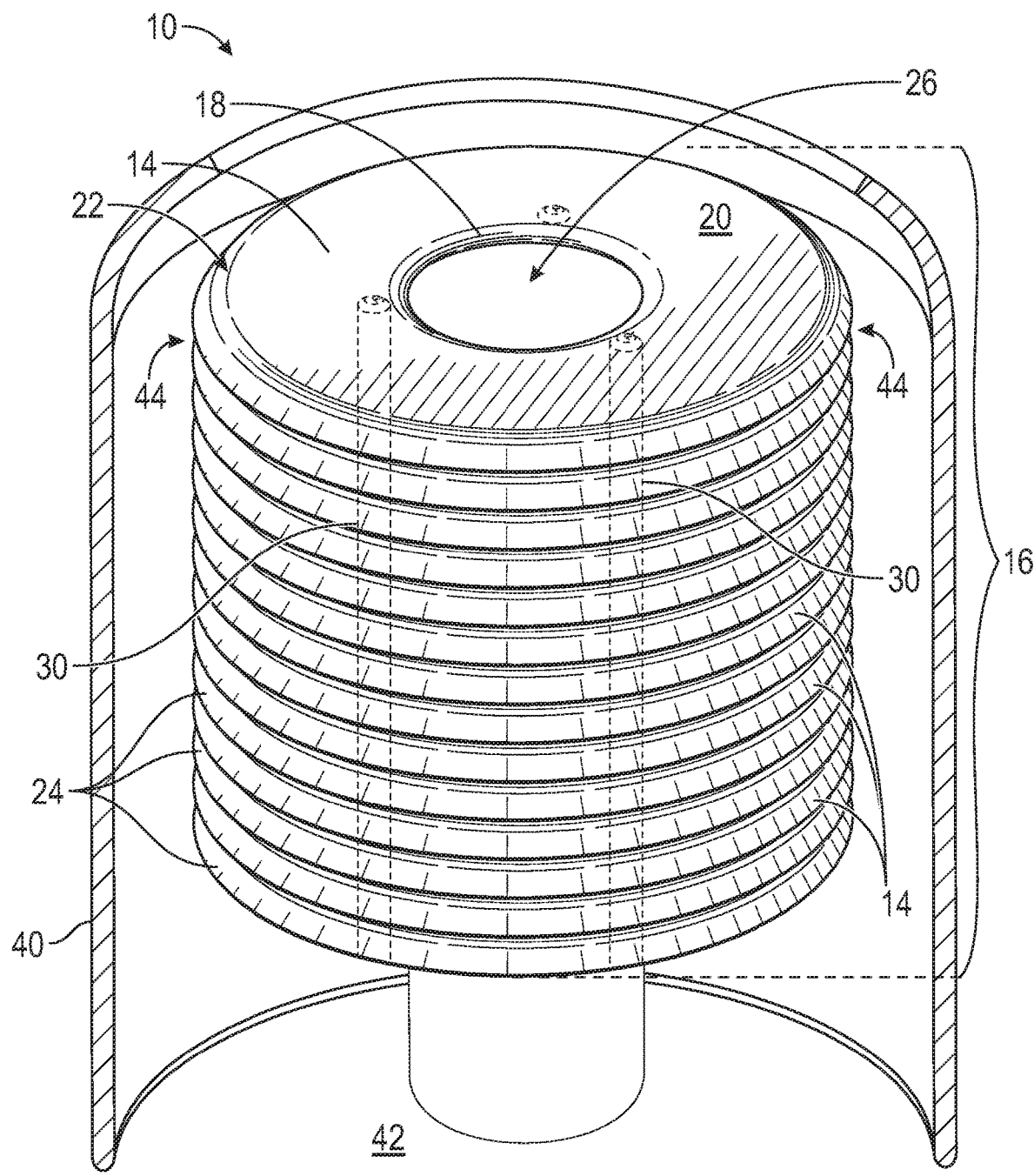
Figure 7:
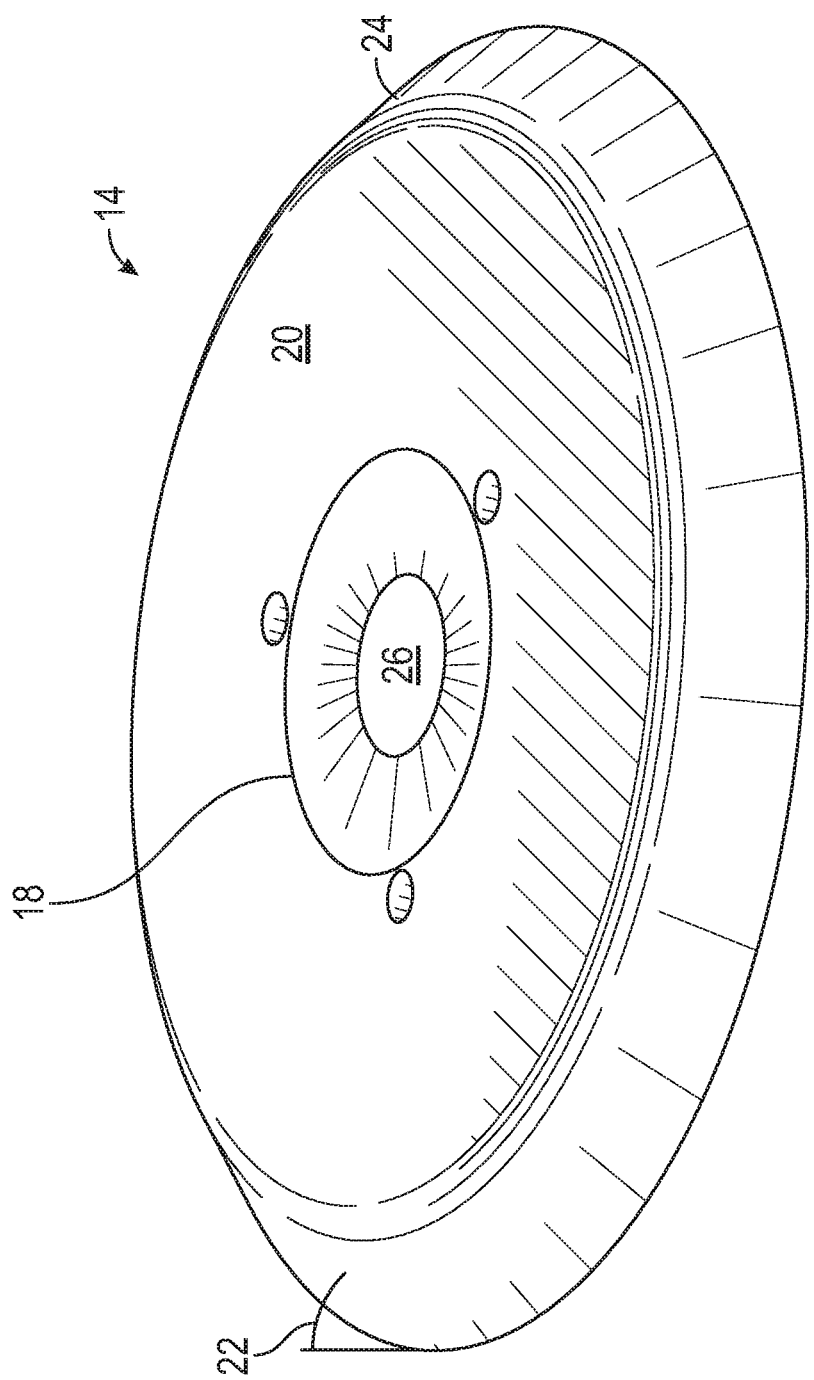
Figure 8:
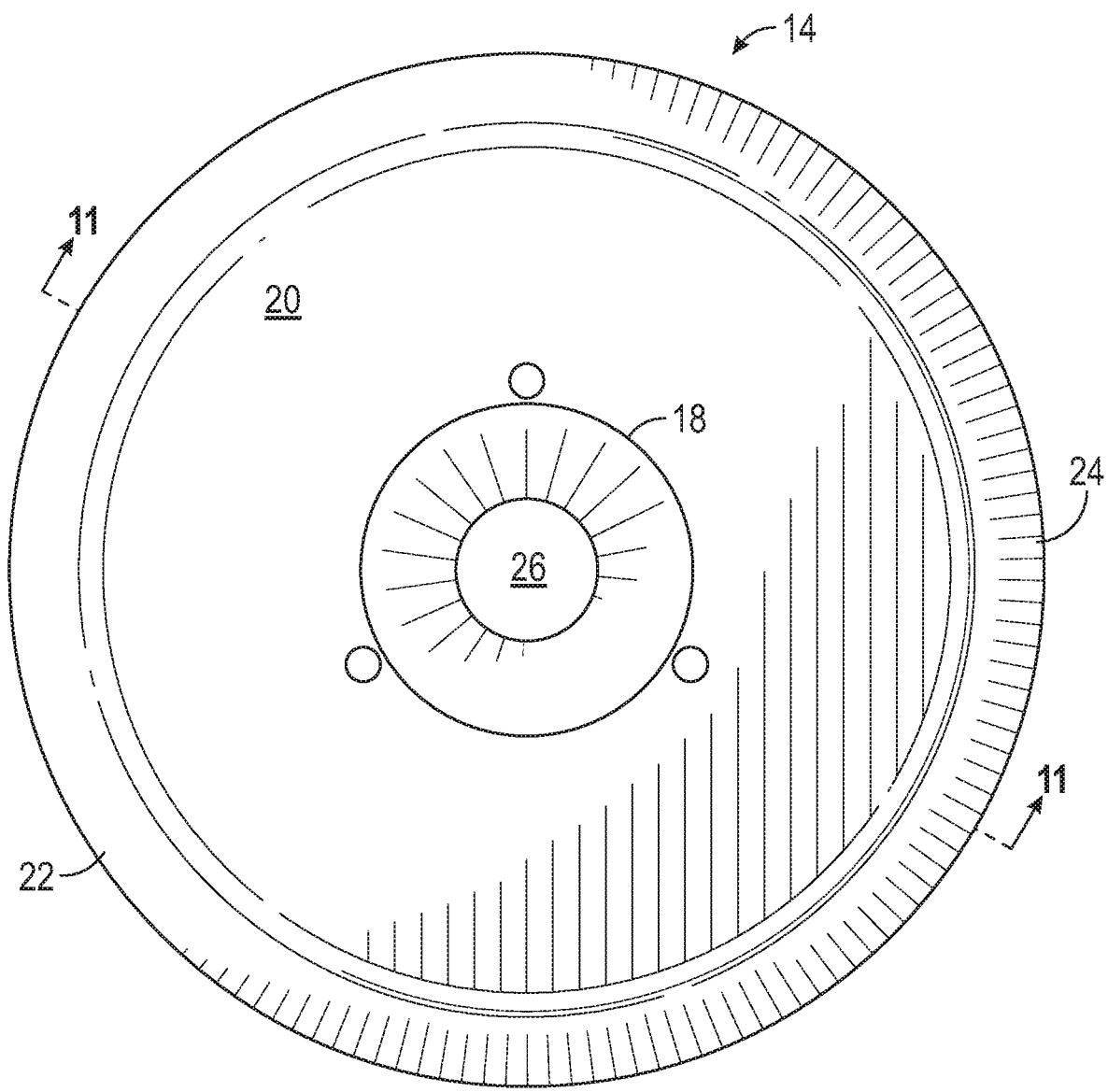
Figure 9:
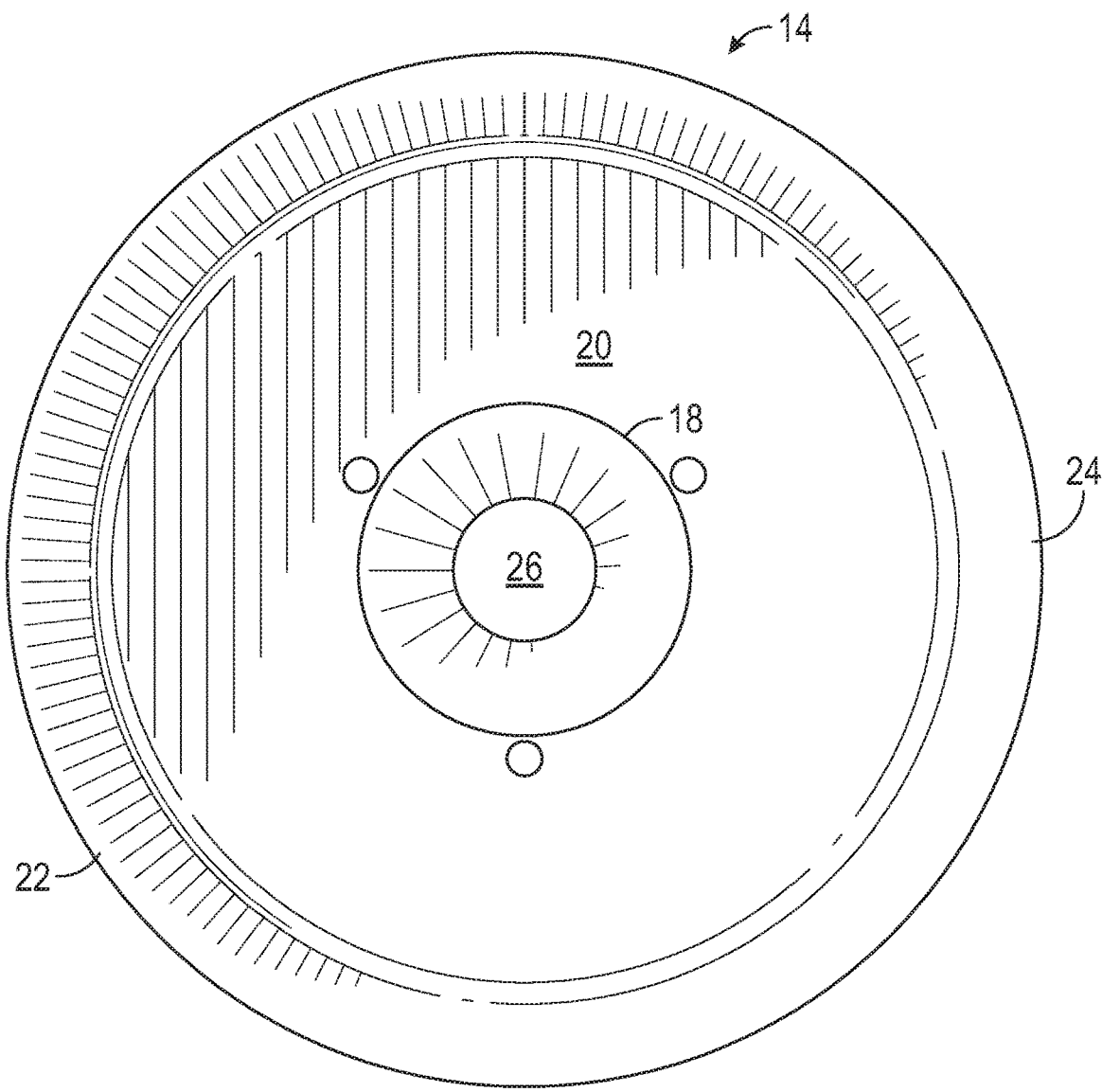
Figure 10:
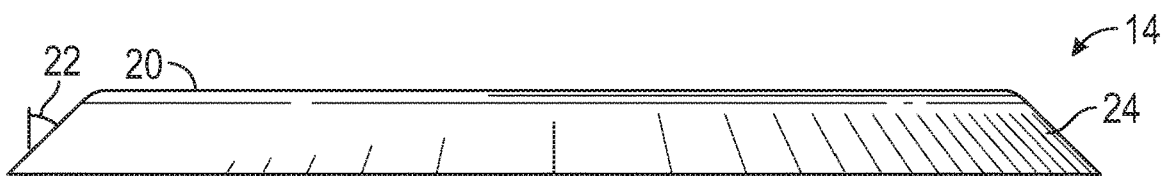
Figure 11:
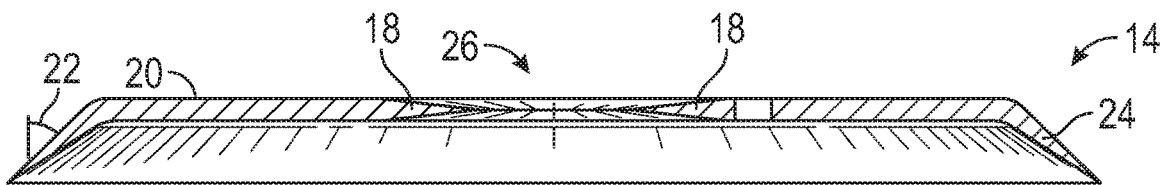
Figure 12:
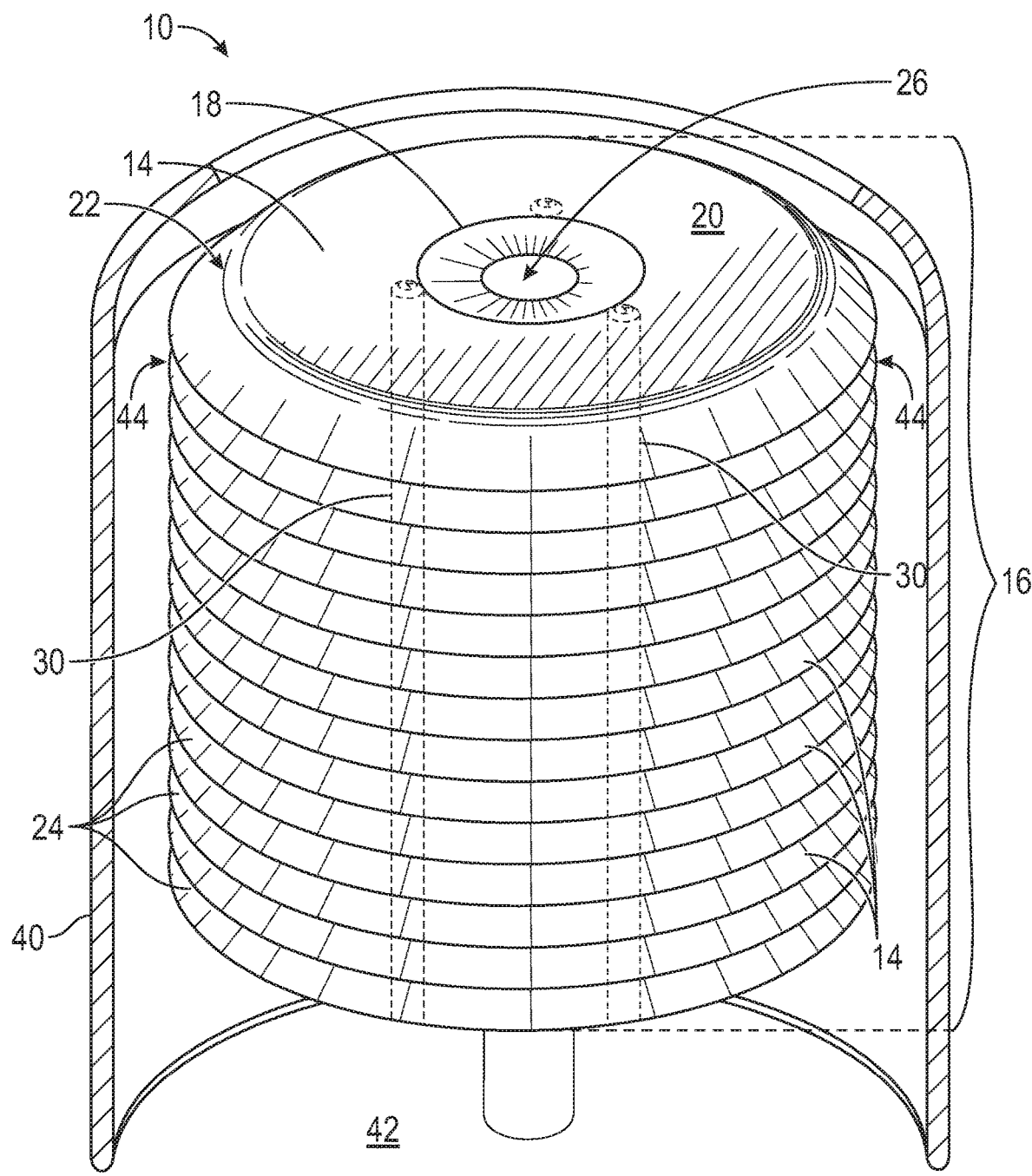
Figure 13:
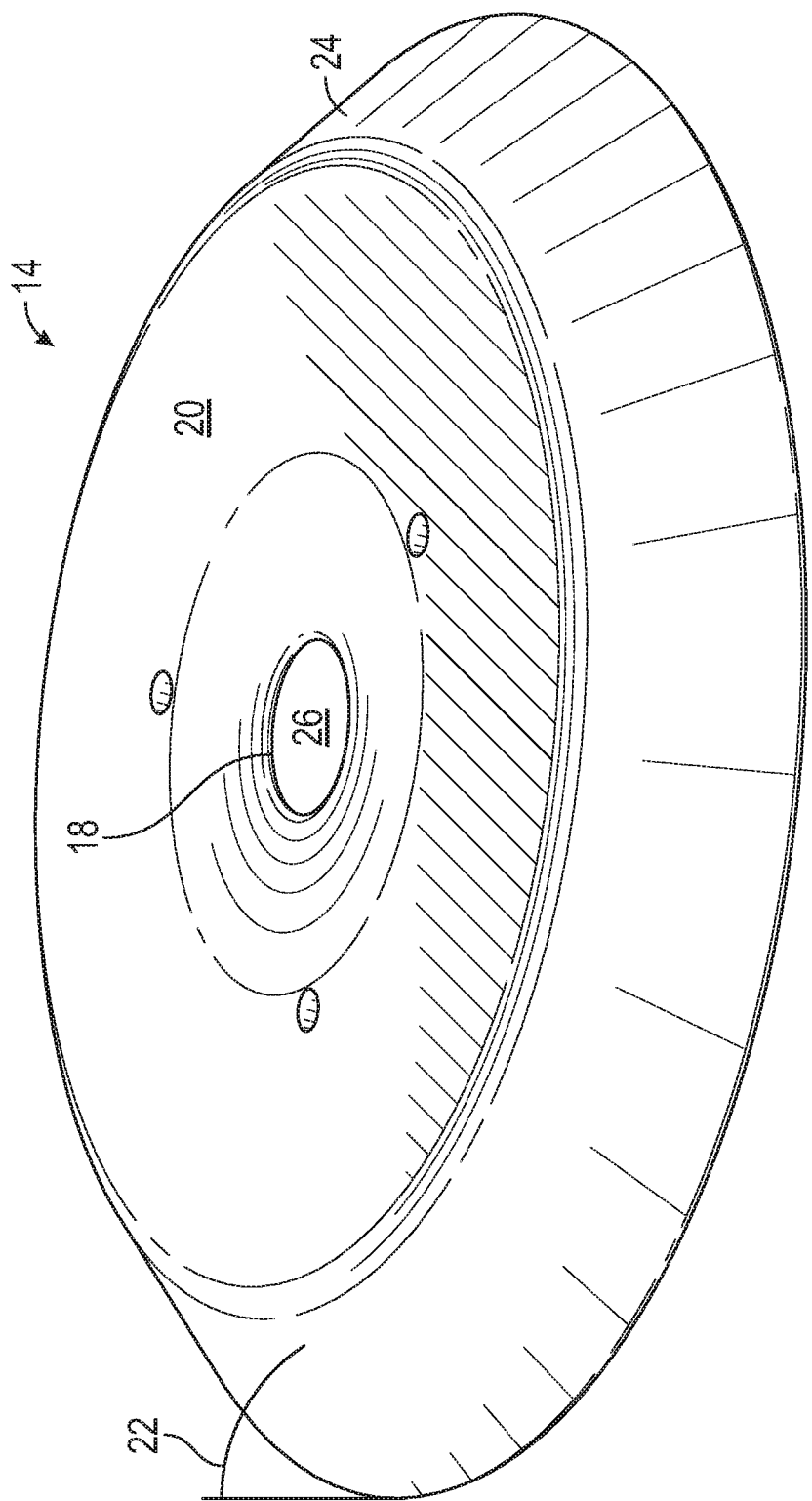
Figure 14:
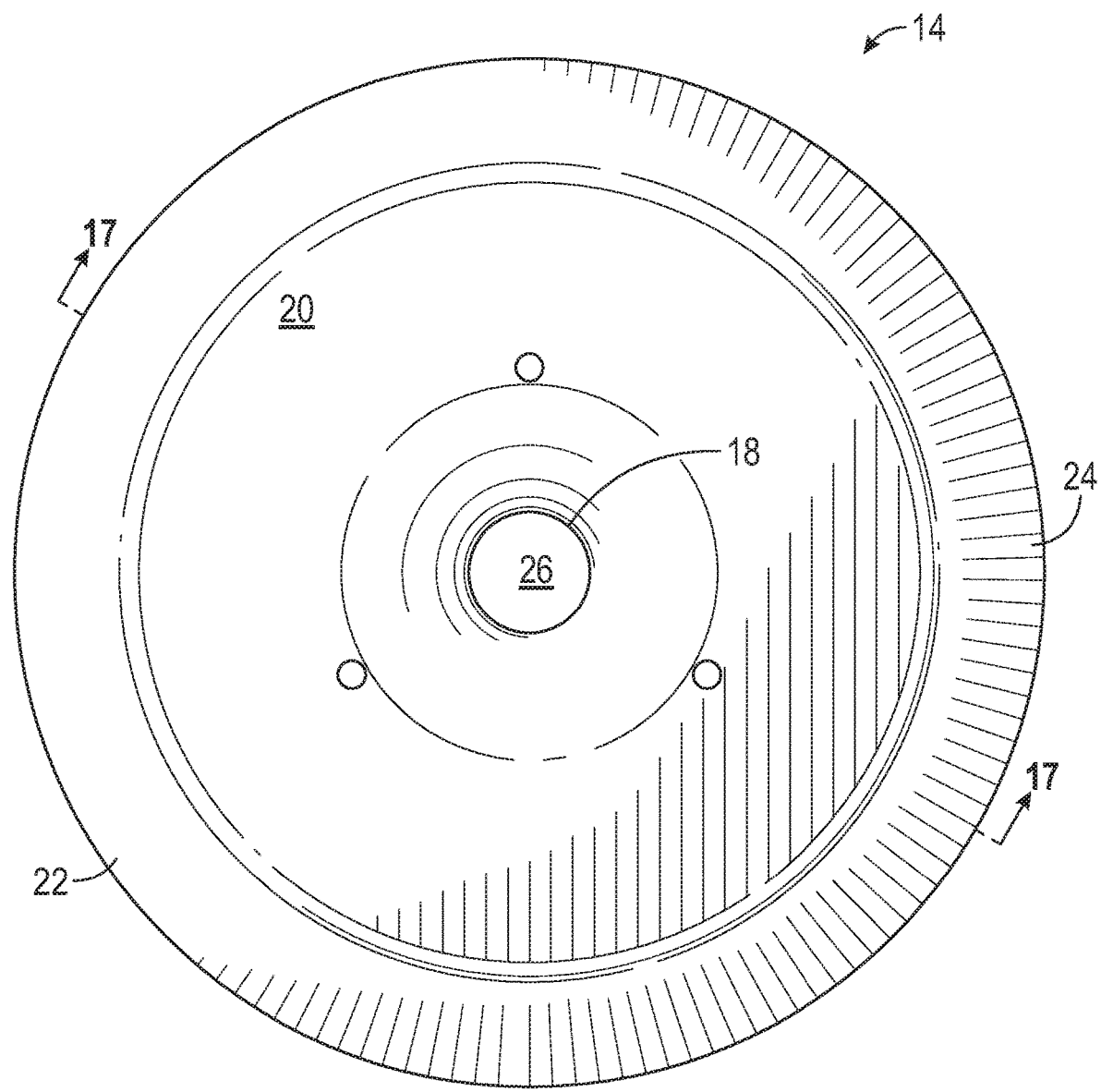
Figure 15:
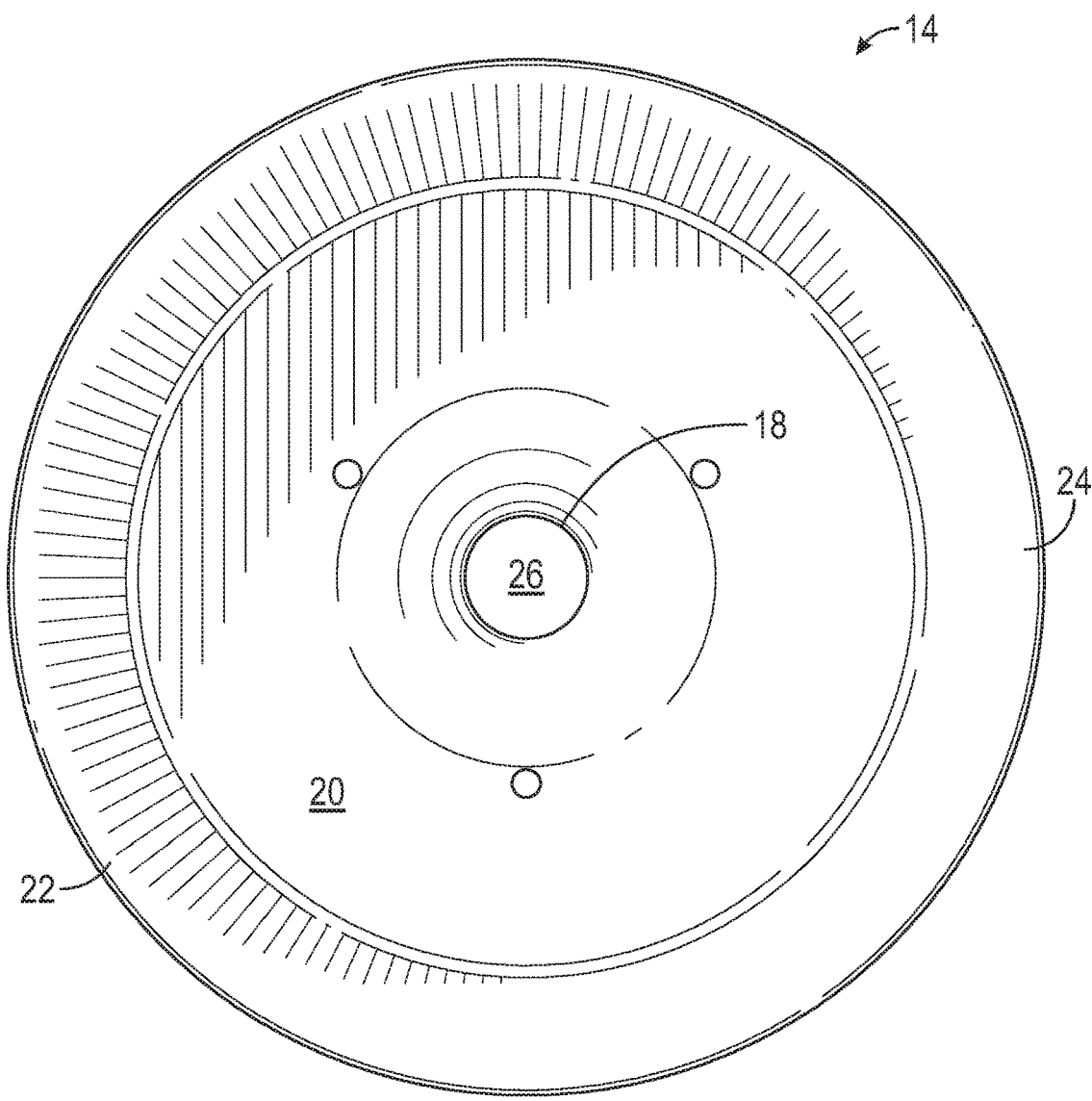
Figure 16:
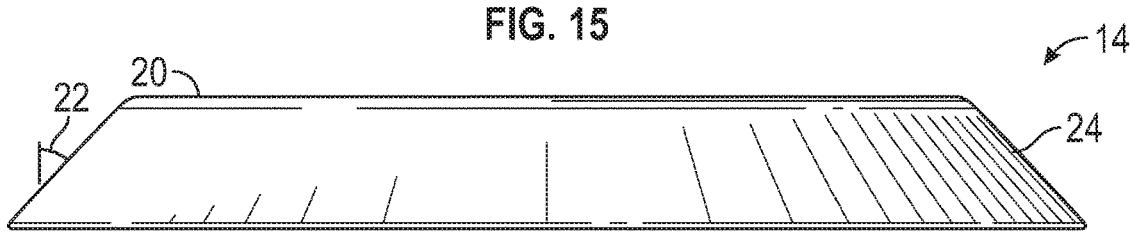
Figure 17:
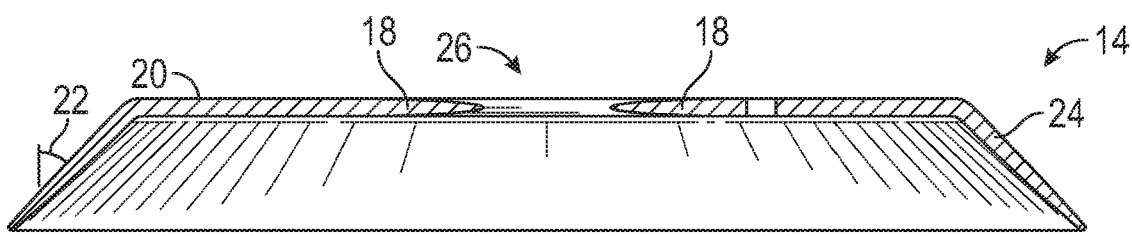
Figure 18:
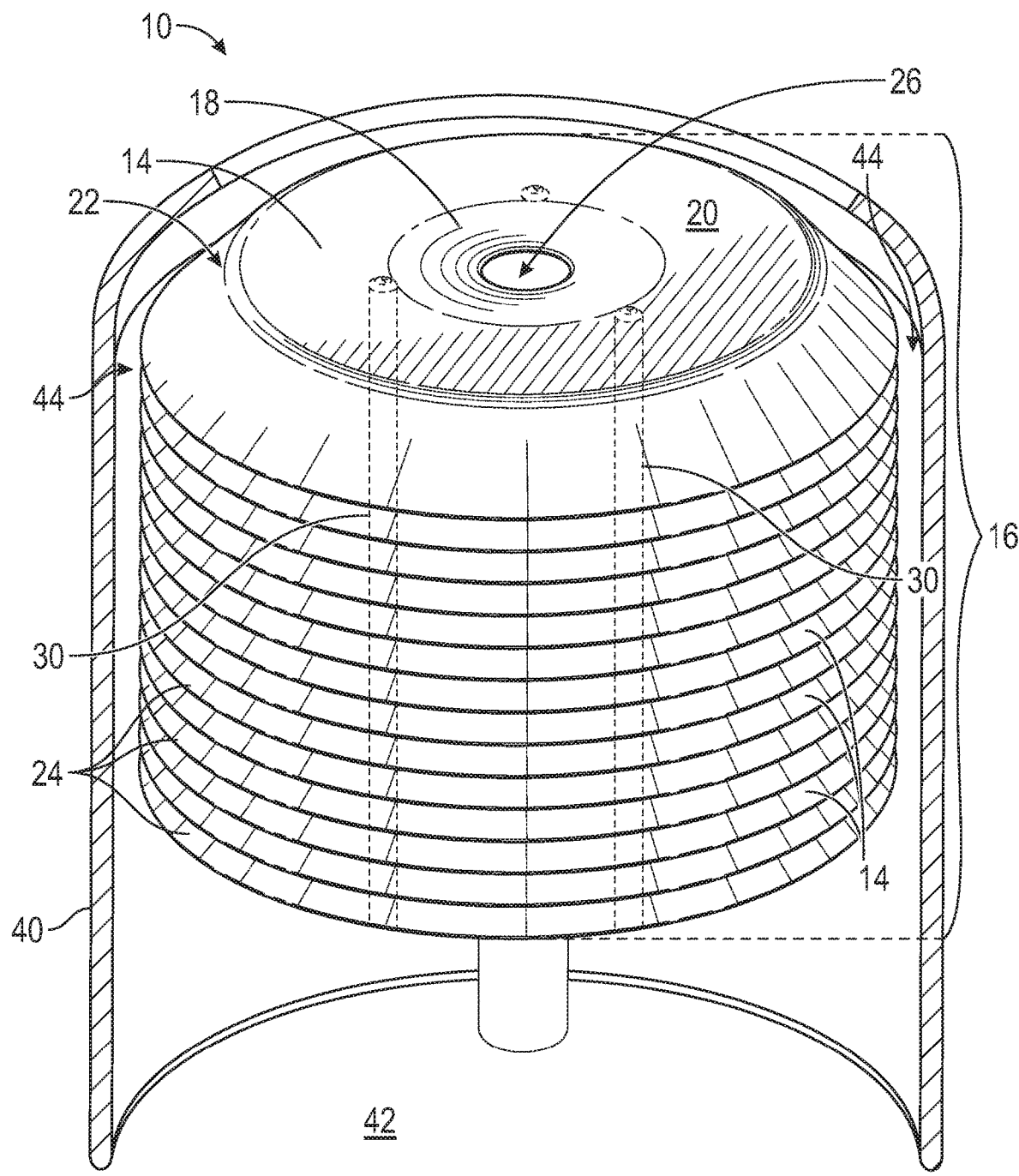

Referring generally to FIGS. 1-37, the present disclosure is directed to a fluid-foil impeller 10 and method of use 12. In particular, the fluid-foil impeller 10 may be comprised of a plurality of fluid-foil discs 14 arranged in a series (e.g., array) 16, wherein the series 16 may include approximately two to twenty-four fluid-foil discs 14. It is also contemplated by the present disclosure that more than twenty-four fluid-foil discs 14 may be utilized in series 16 depending on the intended use of the fluid-foil impeller 10.

The structure, shape and profile of each fluid-foil disc 14 of the fluid-foil impeller 10 may be configured to create a highly effective fluid reaction surface. As used herein, the term "fluid" may comprise many different types of substances that flow freely but maintain a constant volume, such as, for example, water, air, oils, vapors, semi-solids or other types of liquids. Each fluid-foil disc 14 may be comprised of fibrous materials, plastics, composites, stainless steel, aluminum, metal alloys, or combinations thereof. Production of the fluid-foil disc 14 may include a multiple step process involving punching the fluid-foil disc 14 from a sheet, stamping a fixed pitch 22, and die casting and/or machining to cut particular leading edges 18 and/or trailing edges 24 of each fluid-foil disc 14.

Illustrated in FIGS. 1-18, the fluid-foil disc 14 may comprise a leading edge 18, a chord 20 with a fixed pitch 22, and a trailing edge 24. The leading edge 18 may be configured to distribute fluid equally to both sides of the fluid-foil disc 14 allowing equal fluid reactions on each side. The leading edge 18 and trailing edge 24 of the fluid-foil disc 14 may act interchangeably with respect to the direction of fluid-flow through the fluid-foil impeller 10. In particular, fluid may flow from the inner radius to the outer radius of the chord 20. Alternatively, fluid may flow from the outer radius to the inner radius of the chord 20. The chord 20 may be configured to accelerate a fluid to approach the rotational velocity of the impeller 10 before reaching the fixed pitch 22 whereby vectored propulsion ensues tangent to the fixed pitch 22 at an angle, θ. The trailing edge 24 is configured to create a Kutta condition, thereby avoiding Coanda induced turbulence to mitigate cavitation of the fluid-foil disc 14 during operation.

Structural integrity of the fluid-foil discs 14 is important. Each fluid-foil disc 14 may be configured of sufficient thickness to withstand the fluid forces acting on it yet thin enough to avoid additional load. For example and not to be limited thereto, a fluid-foil disc 14 may comprise a thickness of approximately or less than 0.125 inches. The intake 26 (e.g., inlet) of the fluid-foil impeller 10 may be proportional in diameter to the fluid-foil disc 14 having an approximate range of 0.05 $R_f$ to 0.5 $R_f$, where $R_f$ is the radius of the fluid-foil disc 14 measured from the center of the intake 26.

Fluid may enter the fluid-foil impeller 10 through the intake 26 and exit through the exhaust 42. The leading edge 18 of the fluid-foil disc 14 may comprise a super-ellipse. The chord 20 may comprise an approximate range of 0.18 $R_f$ to 0.95 $R_f$ with the fixed pitch 22 occurring at the outer radius of the chord 20. The fixed pitch 22 may occur at an angle of at least 45° with respect to the chord 20. The fixed pitch 22 may transition into the leading edge 18.

Each fluid-foil disc 14 may comprise a unique disc profile. Disc profiles of the fluid-foil discs 14 may vary depending on the intended use of the fluid-foil impeller 10, the fluid medium type and the velocity of the fluid medium. For example, disc profiles may comprise varying lengths, thicknesses and designs for leading edges 18, chords 20, and trailing edges 24 of the fluid-foil discs 14. The disc profiles are configured to improve fluid velocity as it transitions from subsonic velocities through supersonic velocity in air or from non-cavitating velocities to super-cavitating velocities in water, for example.

The fluid-foil impeller 10 of the present disclosure may comprise a plurality of fluid-foil discs 14 arranged in a series 16 and having a uniform disc profile. Alternatively, the fluid-foil impeller 10 of the present disclosure may comprise a plurality of fluid-foil discs 14 arranged in a series 16 and having a combination of different disc profiles.

Shown in FIGS. 1-6 and 13-18, aspects of disc profiles are provided for a fluid-foil disc 14 intended for use in a fluid at subsonic velocities. In particular, the fluid may be described using the following expressions to define the profile of the fluid-foil disc 14:

Leading Edge 18:

$$\left(\frac{x}{b}\right)^{2+n} + \left(\frac{y}{a}\right)^{2+m} = 1$$

Where, m and n are coefficients that adjust the surface slopes at the top and bottom of the function each with ranges of approximately 0.5 to 7.5 inches.

a and b are the width and height of the function with ranges of 0.2 to 1 of the fluid-foil disc 14 thickness.

x is the x axis.

y is the y-axis.

The resulting radius of the super ellipse is located at a point E.

Trailing Edge 24:

$$f(x) = \begin{cases} x - y^2 = R_o, \ y < R_o \\ y = \frac{x}{1}, \ x = R_o \\ y = \rho^3 \sqrt{xR_o}, \ x > R_o \end{cases}$$

Where, $R_o$ is the end point of the fluid-foil disc 14.

ρ is an integer with values from approximately 0.001 to 65,000.

Proportions of the fluid-foil disc 14 include: Chord 20 (0.003 to 0.95 $R_f$) with a fixed pitch 22 occurring at the outer radius of the chord 20 at an angle of θ, with a range of approximately 0° to 90°.

Shown in FIGS. 7-12, an additional aspect of a disc profile is provided for a fluid-foil disc 14 intended for use in a fluid at supersonic velocities.

FIGS. 19-31 illustrate further aspects of disc profiles shown as cross-sectional views of a plurality of fluid-foil discs 14 arranged in a series 16. In particular, each disc profile of the plurality of fluid-foil discs 14 may comprise variable sizes and thicknesses in the series 16. The series 16 may further comprise at least one boundary layer 23. In particular, the boundary layer 23 may be located in between each fluid-foil disc 14 of the plurality of fluid-foil discs 14 arranged in the series 16. The size of the boundary layers 23 (e.g., gaps) between the plurality of fluid-foil discs arranged in the series 16 may depend on the mass of each fluid-foil disc 14, the intended RPMs of the fluid-foil impeller 10, the directional fluid flow through the fluid-foil impeller 10, the viscosity of the fluid and the amount of fluid being moved through the fluid-foil impeller 10.

Figure 19:
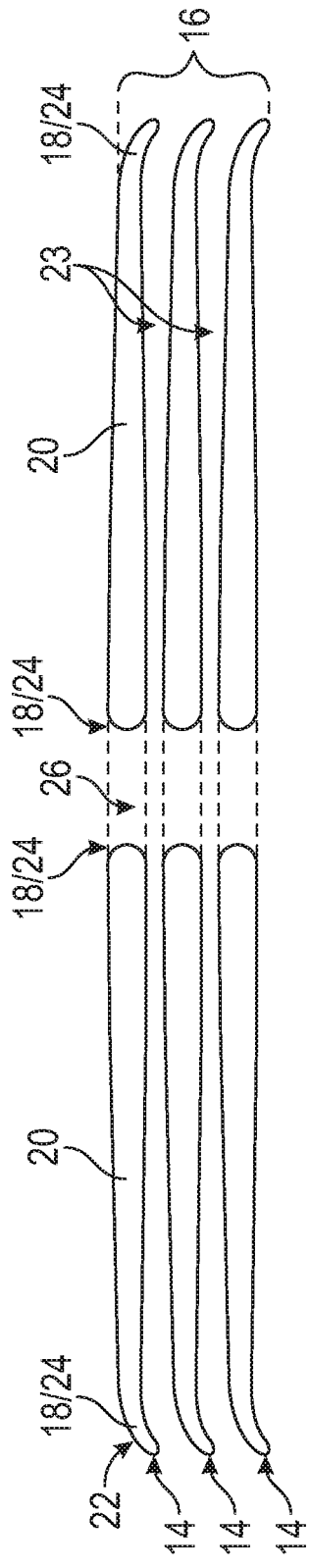

Shown in FIG. 19, another aspect of the disc profile may comprise a fixed pitch 22 at the outer radius of the chord 20, wherein the chord 20 increases in thickness from the outer radius to the inner radius. Thus a variable thickness boundary layer 23 is formed wherein the boundary layer 23 decreases in thickness from the outer radius to the inner radius of the chord 20.

Figure 20:
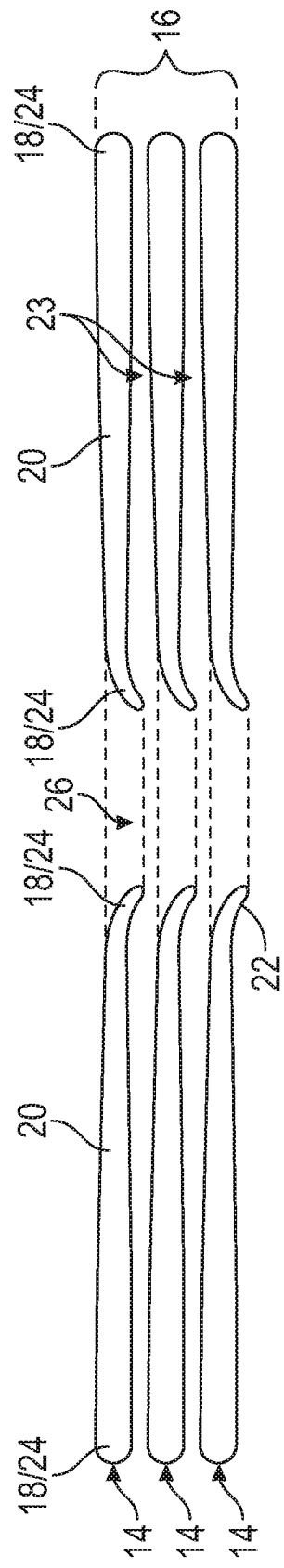

Shown in FIG. 20, another aspect of the disc profile may comprise a fixed pitch 22 at the inner radius of the chord 20, wherein the chord 20 decreases in thickness from the outer radius to the inner radius. Thus a variable thickness boundary layer 23 is formed wherein the boundary layer 23 increases in thickness from the outer radius to the inner radius of the chord 20.

Figure 21:
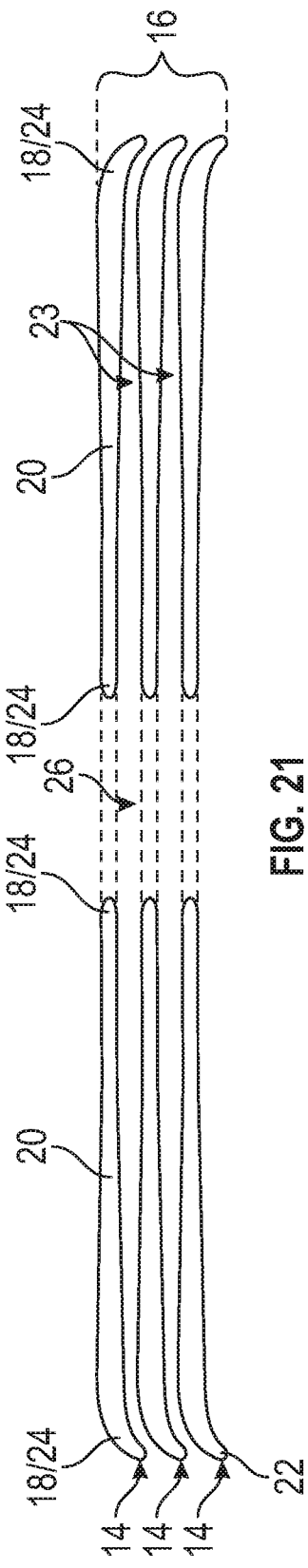

Shown in FIG. 21, another aspect of the disc profile may comprise a fixed pitch 22 at the outer radius of the chord 20, wherein the chord 20 decreases in thickness from the outer radius to the inner radius. Thus a variable thickness boundary layer 23 is formed wherein the boundary layer 23 increases in thickness from the outer radius to the inner radius of the chord 20.

Figure 22:
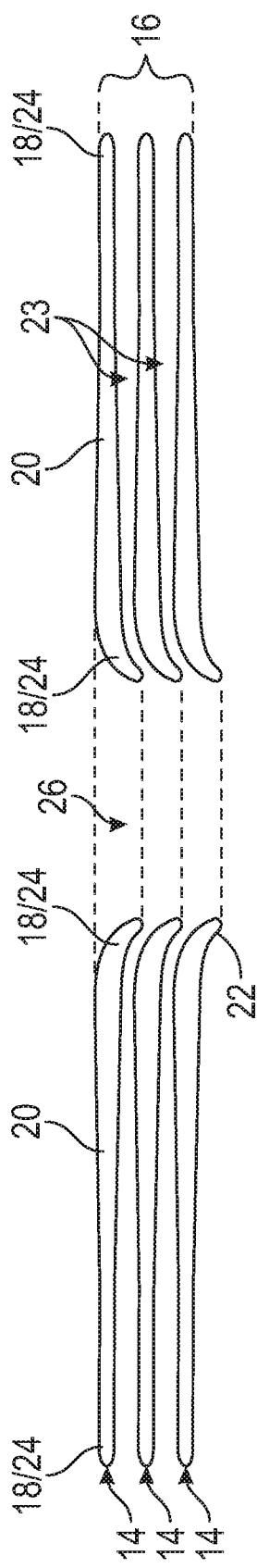

Shown in FIG. 22, another aspect of the disc profile may comprise a fixed pitch 22 at the inner radius of the chord 20, wherein the chord 20 increases in thickness from the outer radius to the inner radius. Thus a variable thickness boundary layer 23 is formed wherein the boundary layer 23 decreases in thickness from the outer radius to the inner radius of the chord 20.

Figure 23:
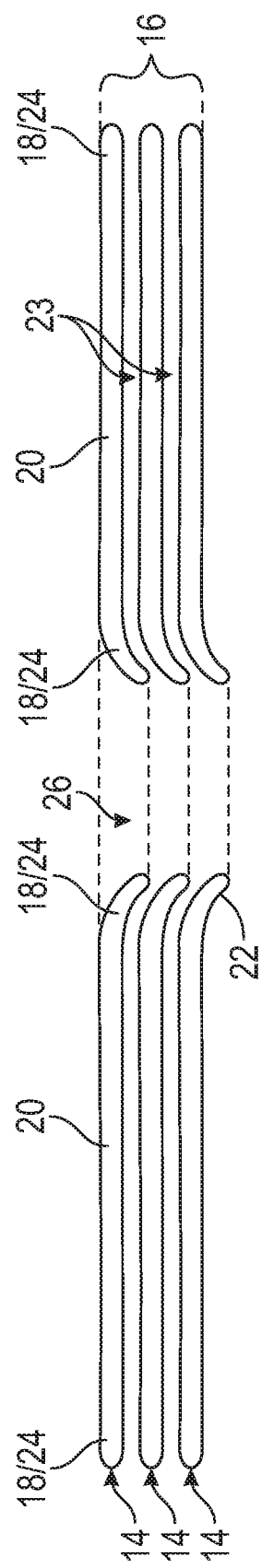

Shown in FIG. 23, another aspect of the disc profile may comprise a fixed pitch 22 at the inner radius of the chord 20, wherein the chord 20 is uniform in thickness from the outer radius to the inner radius. Thus a uniform thickness boundary layer 23 is formed from the outer radius to the inner radius of the chord 20, wherein the boundary layer 23 bends at a prescribed angle consistent with the fixed pitch 22 at the inner radius of the chord 20.

Figure 24:
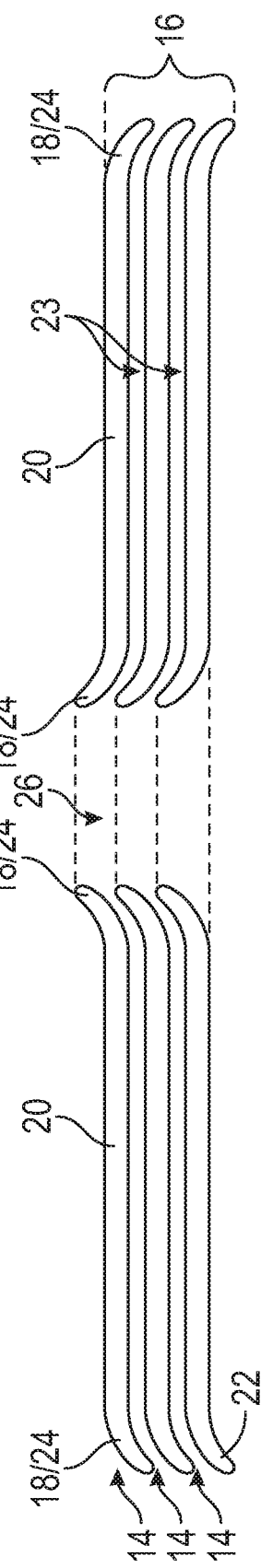

Shown in FIG. 24, another aspect of the disc profile may comprise a first fixed pitch 22 at the inner radius of the chord 20, and a second fixed pitch 22 at the outer radius of the chord 20, wherein the first fixed pitch 22 and the second fixed pitch 22 may angle in opposite directions. The chord 20 may be uniform in thickness from the outer radius to the inner radius. Thus a uniform thickness boundary layer 23 may be formed from the outer radius to the inner radius of the chord 20, wherein the boundary layer 23 bends at prescribed angles consistent with the first and second fixed pitches 22 at the inner and outer radius of the chord 20.

Shown in FIG. 25, another aspect of the disc profile may comprise a first fixed pitch 22 at the inner radius of the chord 20, and a second fixed pitch 22 at the outer radius of the chord 20, wherein the first fixed pitch 22 and the second fixed pitch 22 may angle in the same direction. The chord 20 may be uniform in thickness from the outer radius to the inner radius. Thus a uniform thickness boundary layer 23 may be formed from the outer radius to the inner radius of the chord 20, wherein the boundary layer 23 bends at prescribed angles consistent with the first and second fixed pitches 22 at the inner and outer radius of the chord 20.

Shown in FIG. 26, another aspect of the disc profile may comprise a fixed pitch 22 at the inner radius of the chord 20, wherein the chord 20 is uniform in thickness from the outer radius to the inner radius. Thus a uniform thickness boundary layer 23 is formed from the outer radius to the inner radius of the chord 20, wherein the boundary layer 23 bends at a prescribed angle consistent with the fixed pitch 22 at the inner radius of the chord 20. In this aspect the chords 20 of the plurality of fluid-foil discs 14 arranged in series 16 may vary in length, wherein a chord 20 of a fluid-foil disc towards the top of the series 16 may be shorter in length than the chord 20 of the fluid-foil disc below. In this manner the chords 20 of the plurality of fluid-foil discs 14 may gradually become longer in length from top to bottom of the series 16 in a stepped formation.

Shown in FIG. 27, another aspect of the disc profile may comprise a fixed pitch 22 at the inner radius of the chord 20, wherein the chord 20 increases in thickness from the outer radius to the inner radius. Thus a variable thickness boundary layer 23 is formed wherein the boundary layer 23 decreases in thickness from the outer radius to the inner radius of the chord 20. In this aspect the chords 20 of the plurality of fluid-foil discs 14 arranged in series 16 may vary in length, wherein a chord 20 of a fluid-foil disc 14 towards the top of the series 16 may be shorter in length than the chord 20 of the fluid-foil disc 14 below. In this manner the chords 20 of the plurality of fluid-foil discs 14 may gradually become longer in length from top to bottom of the series 16 in a stepped formation.

Shown in FIG. 28, another aspect of the disc profile may comprise a fixed pitch 22 at the inner radius of the chord 20, wherein the chord 20 decreases in thickness from the outer radius to the inner radius. Thus a variable thickness boundary layer 23 is formed wherein the boundary layer 23 increases in thickness from the outer radius to the inner radius of the chord 20. In this aspect the chords 20 of the plurality of fluid-foil discs 14 arranged in series 16 may vary in length, wherein a chord 20 of a fluid-foil disc towards the top of the series 16 may be shorter in length than the chord 20 of the fluid-foil disc below. In this manner the chords 20 of the plurality of fluid-foil discs 14 may gradually become longer in length from top to bottom of the series 16 in a stepped formation.

Shown in FIG. 29, another aspect of the disc profile may comprise a first series 16 of a plurality of fluid-foil discs 14 having a fixed pitch 22 at the inner radius of the chord 20, wherein the chord 20 is uniform in thickness from the outer radius to the inner radius. This aspect may further comprise a second series 16 of a plurality of fluid-foil discs 14 having a flat shape with a uniform thickness and no pitch. In this aspect the chords 20 of the fluid-foil discs 14 of the second series 16 may have a shorter length than the chords 20 of the fluid-foil discs 14 of the first series 16. The first and second series 16 may be combined to form a single series 16, wherein at least one of the fluid-foil discs 14 of the second series 16 are inserted between the fluid-foil discs 14 of the first series 16.

Shown in FIG. 30, another aspect of the disc profile may comprise a fixed pitch 22 at the outer radius of the chord 20, wherein the chord 20 increases in thickness from the outer radius to a middle radius. The chord 20 may further decrease in thickness from the middle radius to the inner radius. Thus a variable thickness boundary layer 23 is formed wherein the boundary layer 23 decreases in thickness from the outer radius to the middle radius of the chord 20, and further increases in thickness from the middle radius to the inner radius of the chord 20, forming an air foil type boundary layer 23 with a convex shape.

Figure 31:
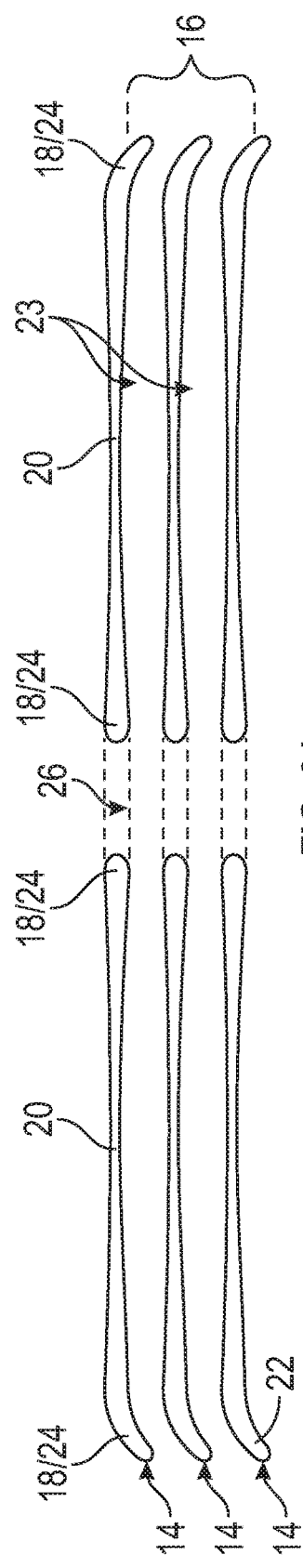

Shown in FIG. 31, another aspect of the disc profile may comprise a fixed pitch 22 at the outer radius of the chord 20, wherein the chord 20 decreases in thickness from the outer radius to a middle radius. The chord 20 may further increase in thickness from the middle radius to the inner radius. Thus a variable thickness boundary layer 23 is formed wherein the boundary layer 23 increases in thickness from the outer radius to the middle radius of the chord 20, and further decreases in thickness from the middle radius to the inner radius of the chord 20, forming an air foil type boundary layer 23 with a concave shape.

In another aspect, the top and bottom fluid-foil discs 14 of the plurality of fluid-foil discs 14 arranged in a series 16 may have an increased thickness as compared to the other fluid-foil discs 14 in the series 16. This configuration may provide for an overall reduction in the mass of the fluid-foil impeller 10 to help maintain stability during operation.

Figure 32:
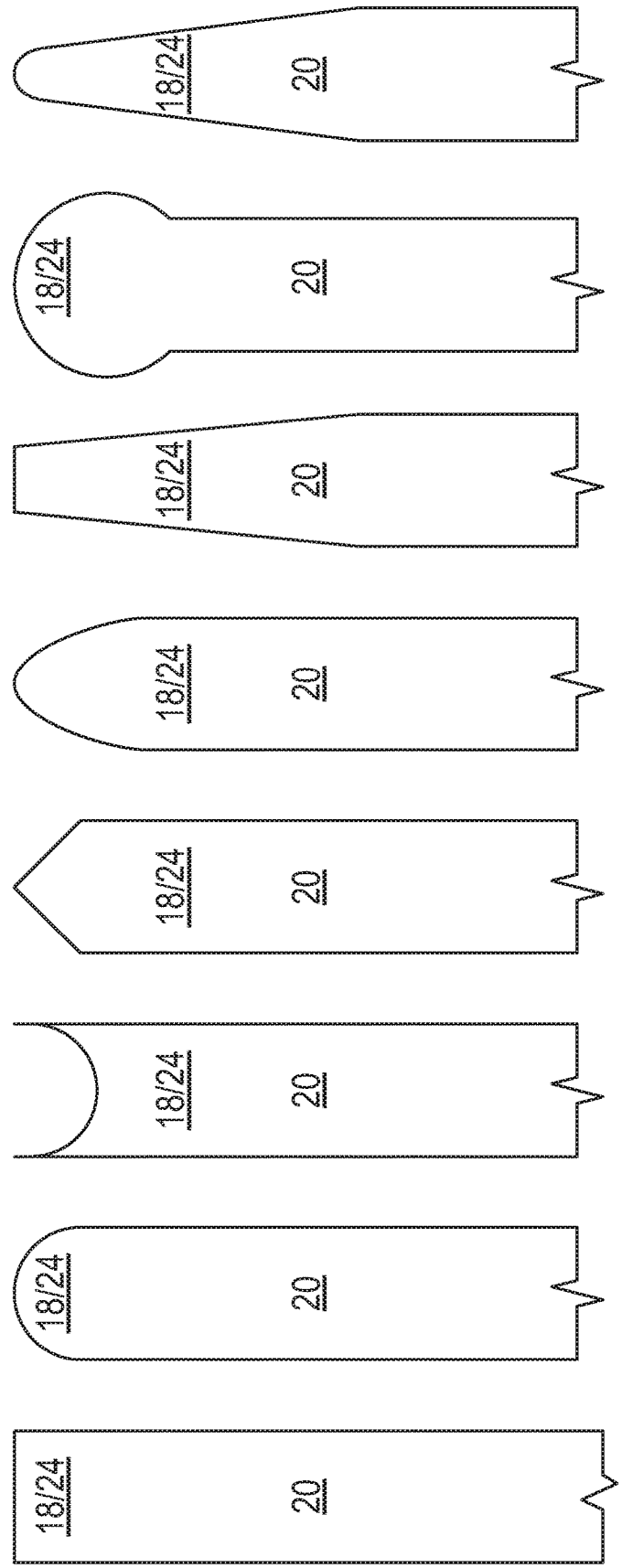

FIG. 32 illustrates further aspects of disc profiles, namely, cross-sectional views of different leading edge 18 and/or trailing edge 24 designs for a fluid-foil disc. For example, and not to be limited thereto, leading edge 18 and/or trailing edge 24 designs may include the following shapes: square; round; convex; concave; diamond; parabolic; chiseled; bulb; and aero-tip. Leading edges 18 and/or trailing edges 24 that are uniform in design may be utilized by a plurality of fluid-foil discs 14 in a series 16, or alternatively, combinations of different designs of leading edges 18 and/or trailing edges 24 may be utilized in a series 16. In this manner particular designs of leading edges 18 and/or trailing edges 24 or combinations thereof may be used to manipulate and optimize efficiencies in fluid flow for the fluid-foil impeller 10 of the present disclosure.

In the aforementioned aspects of disc profiles shown in FIGS. 1-32, fluid may flow through the fluid-foil impeller 10 in alternative directions. In one aspect fluid may flow through the fluid-foil impeller 10 in an outward direction. For example, fluid may enter through the intake 26 of the fluid-foil impeller 10. Fluid may then flow across the leading edges 18 of the plurality of fluid-foil discs 14 at the inner radius of the chords 20. Fluid may then flow in an outward direction across the chords 20 and towards the trailing edges 24 at the outer radius of the chords 20. Fluid may then flow across the trailing edges 24 and exit the fluid-foil impeller 10 via the exhaust 42.

Alternatively, in another aspect fluid may flow through the fluid-foil impeller 10 in an inward direction. For example, fluid may enter through the exhaust 42 of the fluid-foil impeller 10. Fluid may then flow across the trailing edges 24 of the plurality of fluid-foil discs 14 at the outer radius of the chords 20. Fluid may then flow in an inward direction across the chords 20 and towards the leading edges 18 at the inner radius of the chords 20. Fluid may then flow across the leading edges 18 and exit the fluid-foil impeller 10 via the intake 26. Thus in this manner the fluid-foil impeller 10 of the present disclosure may be configured for fluid to flow through the impeller in alternative directions wherein the leading edges 18 and the trailing edges 24 may act interchangeably.

The fluid-foil impeller 10 of the present disclosure is not intended to be limited to the various aspects of disc profiles shown above in FIGS. 1-32 but are rather meant to demonstrate illustrative examples of disc profiles. Indeed, the fluid-foil impeller 10 of the present disclosure may utilize varying computations and combinations of disc profiles to determine a fluid-foil disc's optimal capabilities depending on intended use.

Illustrated in FIGS. 33-37, the fluid-foil impeller 10 of the present disclosure may comprise a plurality of fluid-foil discs 14 arranged in a series 16, a plurality of spacers 28 configured to equally space apart each fluid-foil disc in the series 16, at least one structural post 30 or support configured to connect the plurality of fluid-foil discs 14 and a carrier 32. Each fluid-foil disc 14 of the plurality of fluid-foil discs 14 in the series 16 may be evenly spaced apart by the spacers 28 of a thickness, δ. Each fluid-foil disc 14 may be variable or equidistant from the next in the series 16, with the distance determined by a derivative of a Reynold's number for a given fluid type using the following equations:

$$\mathrm{Re}_x = \frac{\beta P_\infty V_\infty x}{\mu_\infty};$$

Where,
$\mathrm{Re}_x$ is a Reynold's number;
$\beta$ is a coefficient of adjustment ranging from 0.08 to 0.98;
$P_\infty$ is the free stream density of a fluid;
$V_\infty$ is the free stream velocity of a fluid;
x is the radius of the fluid-foil.

$$\delta \approx \frac{5.0}{\sqrt{\mathrm{Re}_x}} x;$$

Where,
δ is the boundary layer 23 thickness;
x is the radius of the fluid-foil.

Figure 33:
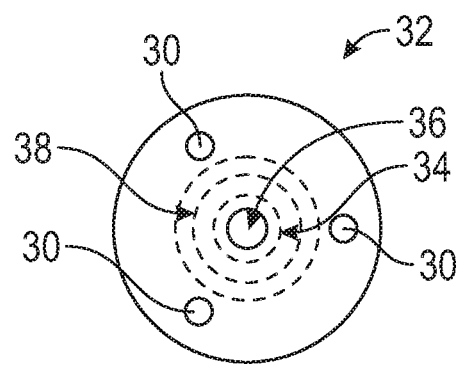
Figure 34:
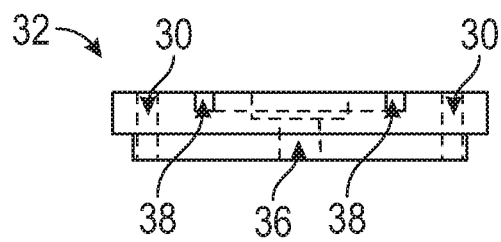

Shown in FIGS. 33-34, the plurality of fluid-foil discs 14 in the series 16 may be mounted to a carrier 32 using at least one structural post 30 which is affixed at a circumference proportional to the intake 26 radius of the fluid-foil discs 14. The number of structural posts 30 utilized by the present disclosure may comprise at least one structural post 30. In one aspect of the present disclosure the number of structural posts 30 utilized may range between two to six structural posts 30. The structural posts 30 are configured to provide locations suitable for the spacers 28 to maintain spacing between each fluid-foil disc 14 thereby creating boundary layers 23 between each fluid-foil disc 14, wherein at least one spacer 28 separates each fluid-foil disc 14 in the series 16. A spacer 28 may comprise, for example, a washer that is configured to fit around the structural posts 30. In this example the washer may comprise a circular, elliptical, oval, tear-drop, or other applicable shape that is configured to reduce fluid turbulence. The spacers 28 between the plurality of fluid-foil discs 14 may protrude into the intake 26, thus, reducing the area of the spacers 28 inside the boundary layer 23 between fluid-foil discs 14 and reducing the effective area of turbulence induced by the Coanda effect from the spacers 28. Such a configuration further increases the working area of the boundary layer 23 between fluid-foil discs 14. The spacers 28 may be comprised of fibrous materials, plastics, composites, stainless steel, aluminum, metal alloys, or combinations thereof.

Further shown in FIGS. 33-34, the carrier 32 may be coupled 34 to a drive shaft 36 that is further connected to an engine, turbine, or motor configured to provide power for rotating the fluid-foil impeller 10. The coupling 34 may be recessed to achieve low turbulence while permitting fluid flow to be present at each fluid-foil disc 14. Methods for coupling 34 include, but are not limited to: low profile nut and washer combinations; snap rings; and other coupling 34 means utilized in the industry. The carrier 32 may be proportional, smaller or larger in size to the plurality of fluid-foil discs 14 and may further be configured to provide support through a majority of the chord 20 length, stopping as the fixed pitch 22 is approached. The plurality of fluid-foil discs 14 may be mounted to the carrier 32 via utilizing the structural posts 30, wherein the plurality of fluid-foil discs 14 may be circumscribed about the carrier's 32 center radius. The carrier 32 may be manufactured from metal alloys using a molding and machining process. It is contemplated that other materials may also be utilized in the manufacture of the carrier 32, such as fibrous materials, plastics, composites, stainless steel, aluminum or combinations thereof.

Still further shown in FIGS. 33-34, the carrier 32 of the fluid-foil impeller 10 may comprise self-shifting masses as a means for balancing the fluid-foil impeller 10 providing adaptive balancing while the carrier 32 is in motion, such as a balancing track 38. One aspect of the balancing track 38 may comprise a circumferential track circumscribed about the center radius with several ball bearings placed in the track. Another aspect of the balancing track 38 may comprise a circumferential track circumscribed about the center radius filled with a very dense liquid such as mercury. In yet another aspect the carrier 32 may comprise two balancing tracks 38 circumscribed about the structural posts 30 and filled with self-shifting masses (e.g., oil and/or ball bearings with an O-ring seal). Still another aspect of the balancing track 38 may comprise multiple tracks cut into the carrier 32 at varying radii circumscribed about the center, the tracks filled with the aforementioned self-shifting masses.

Figure 35:
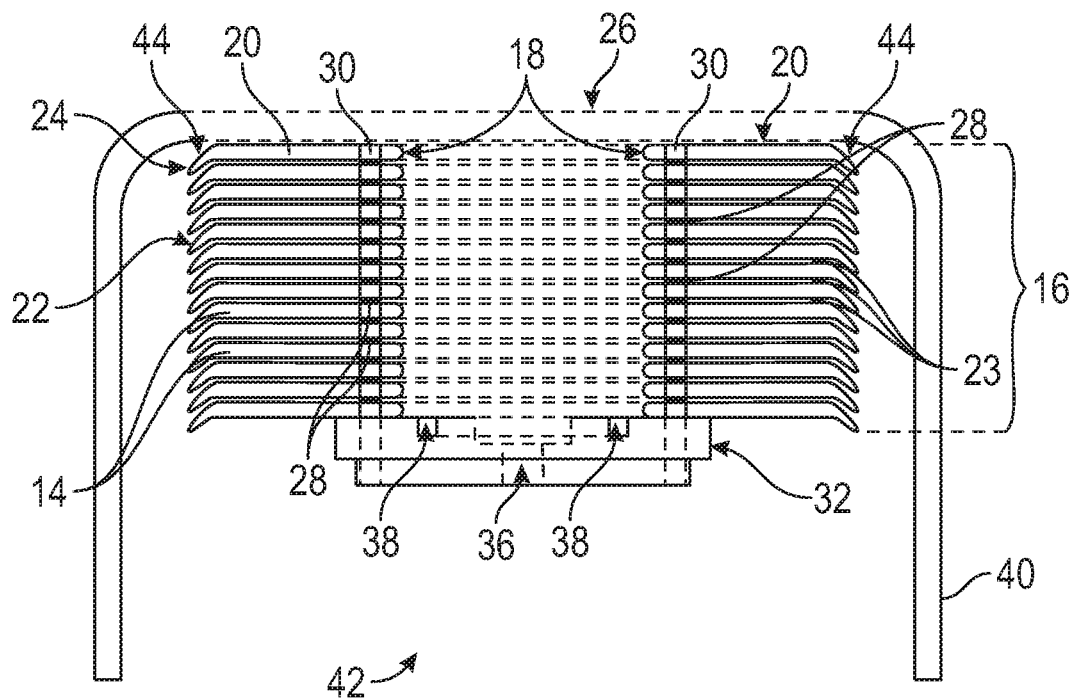
Figure 36:
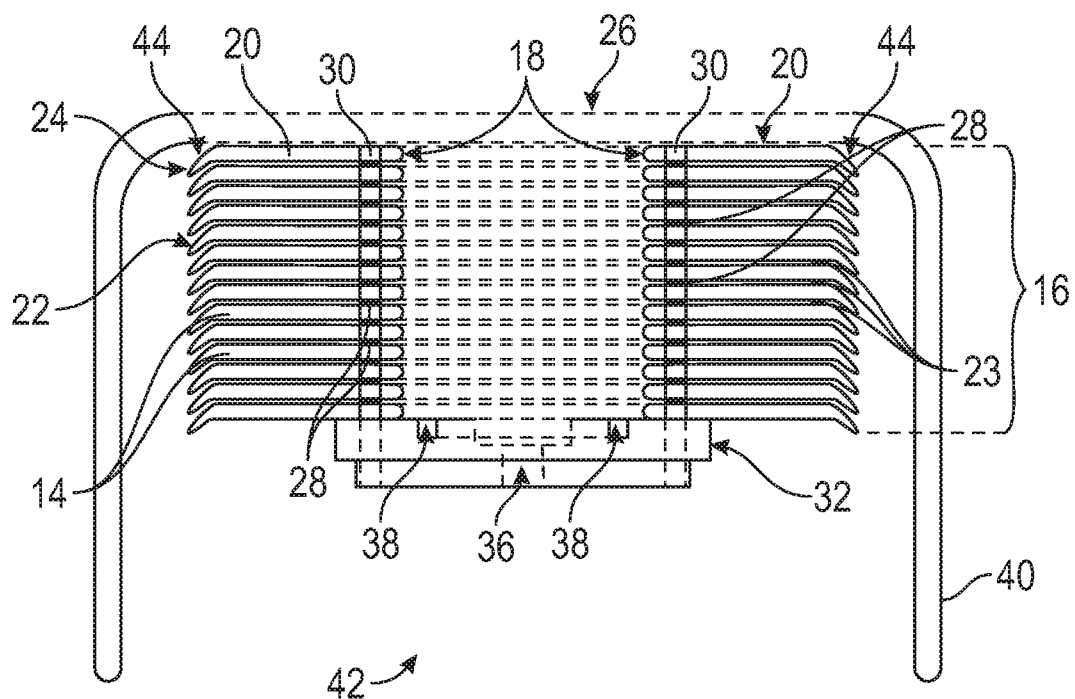
Figure 37:
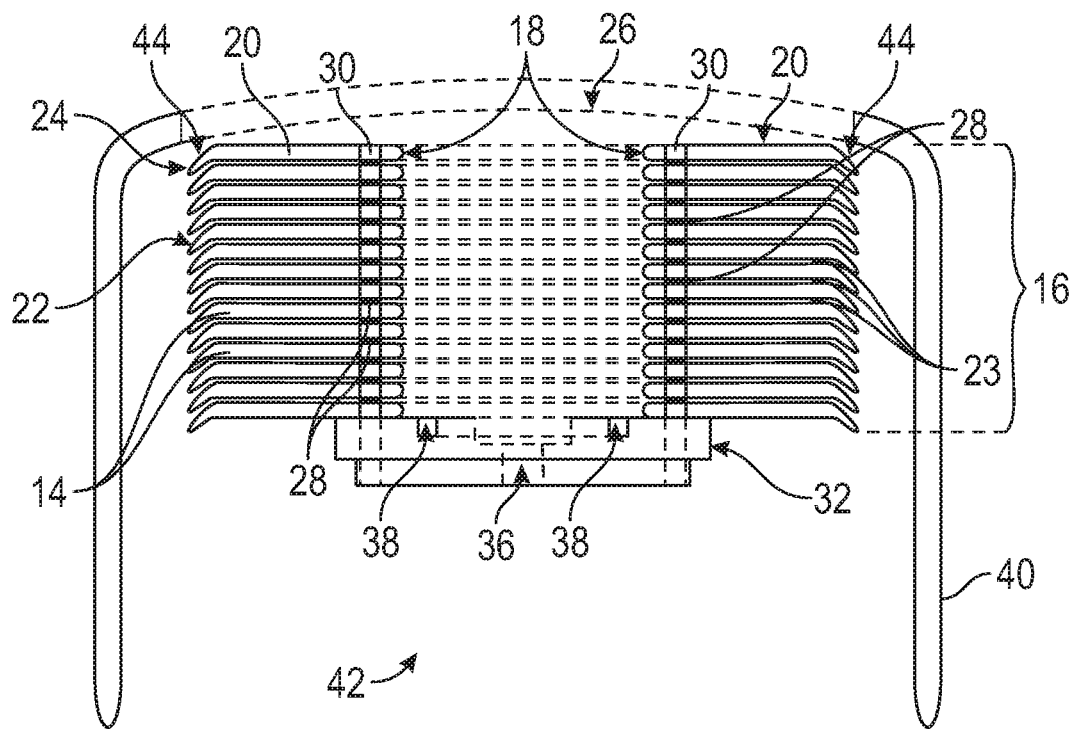

Illustrated in FIGS. 35-37, the fluid-foil impeller 10 may comprise a standard or Venturi shroud 40. In particular the shroud 40 may be a static working member configured to partially or fully encompass the fluid-foil impeller 10. The shroud 40 may further extend beyond the fluid-foil impeller 10 and may include variable geometry. The shroud 40 largely functions as a collector and diverter. The shroud 40 may be configured to collect expelled fluid while diverting fluid to at least one exhaust 42 (e.g., outlet). At least one secondary fluid flow may be achieved by means of at least one peripheral Venturi inlet 44 implementing a Venturi effect. Primary and secondary flows are additive as they are integrated in the shroud 40, thus, producing peak thrust at the shroud 40 exhaust 42.

Shown in FIGS. 35-37, the shroud 40 may comprise a leading edge at the intake 26 and a trailing edge at the exhaust 42. The leading edge may be configured to allow the fluid to flow around the outside of the shroud 40 as well as allowing the fluid to flow into the peripheral Venturi inlet 44 of the shroud 40 and, optionally, into a stator (not shown). The trailing edge may be configured to create a Kutta condition preventing the fluid from wrapping around the shroud 40 at the exhaust 42 in an undesired direction which would result in a reduction in the horizontal component of fluid propulsion.

Further shown in FIGS. 35-37, the shroud 40 may comprise varying shapes to provide for optimal flow in a fluid, depending on the intended use of the fluid-foil impeller 10 and the velocity of the fluid and fluid type that it will be utilized therein. For example and not to be limited thereto, the shape may take on the form of a super ellipse, parabola, compound parabola, or other similar shapes. The shroud 40 may be proportional in its radius to the fluid-foil discs 14 at an approximate range of 1.1 $R_f$ to 2.5 $R_f$. The shroud 40 may also be proportional to the thickness of the fluid-foil impeller 10 at an approximate range of 1.25 $I_h$ to 7 $I_h$, where $I_h$ may be the thickness of the fluid-foil impeller 10. The thickness of the fluid-foil impeller 10 may be determined by finding the sum of the number of fluid-foil discs 14 multiplied by their thicknesses and adding that to the sum of the number of spacers 28 multiplied by their thicknesses or δ. The shroud 40 may further comprise a deflector having an inside shape resembling a parabolic or semi-circle at the intake 26 that transitions into a cylinder. The shroud 40 may be situated, with respect to the fluid-foil impeller 10, such that a peripheral Venturi inlet 44 is present implementing a Venturi effect. The shroud 40 may have a thickness that provides the structural integrity necessary to withstand the forces of the fluid and may be manufactured using materials such as fibrous materials, plastics, composites, stainless steel, aluminum, metal alloys, fiberglass or combinations thereof.

In yet another aspect of the present disclosure, a method 12 of using the fluid-foil impeller 10 is provided. The method 12 may comprise providing the fluid-foil impeller 10 of the present disclosure. The method 12 may further comprise using the fluid-foil impeller 10 in connection with the following examples of industrial application: a trolling motor; a diver propulsion vehicle; an autonomous underwater vehicle; an outboard marine propeller; a marine thruster; a jet ski propeller; a propulsion unit with oxygen exchange; an automobile blower motor; a residential HVAC; an HVAC duct booster; an A/C unit fan; a dehumidifier; a jet engine; a grain dryer; an injection molding coolant pump; a blast furnace blower; a desalination machine; a firefighting pump; a vacuum pump; an air slide (air bed); medical equipment; a fuel vaporizing system for internal combustion engines; a water aerator; an air pollution scrubber; an air curtain; a cooling tower; a natural gas liquefaction; dust control; fume exhausting control; a ventilation fan; glass tempering; ground water remediator; a make-up air unit; an exhaust fume extractor; process control tempering; general purpose air handling; an HVAC unit on a mass transportation vehicle, such as a bus, train, aircraft, ship; a wind tunnel; and/or a deep water mining pump.

EXAMPLES OF INDUSTRIAL APPLICATION

Additional examples of methods 12 of using the fluid-foil impeller 10 of the present disclosure in industrial applications are detailed below. The present disclosure is not limited to the industrial application examples described herein, but are provided for illustrative purposes only.

1. The fluid-foil impeller 10 and method 12 of the present disclosure may be utilized in a marine propulsion application, either partially or completely submerged in water at any depth or pressure. The fluid-foil impeller 10 may be used singly as an auxiliary propulsion system such as a trolling motor or when deployed as multiple impellers such as in an array of two or more fluid foil impellers 10. The fluid-foil impeller 10 may also be used as a primary propulsion system for any maritime vessel. For example, each of a plurality of fluid-foil impellers 10 may work in parallel and their thrust combinative, thus producing higher volume motive force as each fluid-foil impeller 10 is added to an array.

2. The fluid-foil impeller 10 and method 12 of the present disclosure may be utilized in HVAC applications, where the fluid to be moved is air rather than water. Fluid-foil impellers 10 of the present disclosure are well suited for moving air in volume. The fluid-foil impeller 10 may be used within HVAC ducting for boosting air volume and pressure, as the main or principle air mover in furnaces and air conditioning systems and as direct vent through-wall ventilators such as in residential and commercial range hoods.

3. The fluid-foil impeller 10 and method 12 of the present disclosure may be utilized as an effective vacuum pump with a single fluid-foil impeller 10 configured to move virtually any fluid including air, water, caustic chemicals and toxic gasses. The vacuum function may be implemented by ducting or hoses connecting the intake 26 of the impeller 10 to the system requiring the vacuum. Output may be accomplished through the fluid-foil impeller's 10 high pressure exhaust 42.

4. The fluid-foil impeller 10 and method 12 of the present disclosure may be utilized in a grain storage drying system application. The fluid-foil impeller 10, by virtue of its pressurized output, may be used to force higher pressure air up through stored grain thereby driving humidity out of the grain and preventing rot. Air for grain drying may need to be heated after the fluid-foil impeller 10 to prevent damage to the drive motor. An effective high volume configuration of this application may include two or more fluid-foil impellers 10 working in parallel to increase the volume of air available to dry the grain.

5. The fluid-foil impeller 10 and method 12 of the present disclosure may be utilized in the application of electric motor cooling fans, wherein a single fluid-foil impeller 10 may be employed as an integrated air mover. The fluid-foil impeller 10 may be mounted directly on the motor's rotor shaft. The vacuum or intake 26 end of the fluid-foil impeller 10 may draw air through the motor housing, effectively cooling the rotor and bearings as well as the internal surface areas of the stator windings. In the case of a wound rotor or universal motor the commutator and brushes assembly may also be cooled through the air circulated. Air thus heated as it is drawn through the motor is exhausted out of the motor through the fluid foil impeller's high pressure exhaust 42. A secondary, but also effective cooling function of the fluid-foil impeller 10, is that the fluid-foil discs 14 themselves act as large surface area cooling fins that draw heat from the motor's rotor and dissipate it into the exhaust 42.

6. The fluid-foil impeller 10 and method 12 of the present disclosure may be used as a high cubic feet per minute ("CFM") fan. For example in one aspect the fluid-foil discs 14 may have a radius ranging from approximately 0.5 inches to 18 inches, the central intake 26 having a radius ranging from approximately 0.25 inches to 9 inches, with the fixed pitch 22 located $\frac{1}{32}^{nd}$ inch to about 2 inches from an edge of the fluid-foil discs 14 with the fixed pitch 22 angle ranging from approximately 0.5° and 89.5°. The shroud 40 may have a radius ranging from approximately 0.75 inches to 23 inches. The shroud 40 and the leading edge 18 of the fluid-foil discs 14 may be defined by a number of variations of the super ellipse function. The trailing edge 24 of the fluid-foil discs 14 may be defined by a number of variations of complex parabolic functions or a simple parabola. The trailing edge 24 of the fluid-foil discs 14 may be at the fixed pitch 22. The applicable RPMs utilized may range from approximately 4,500 to 100,000 RPMs or greater. The boundary layer 23 thickness may range from approximately 0.021 inches to 0.253 inches, wherein the thickness may vary depending on the fluid medium and RPM range desired.

7. The fluid-foil impeller 10 and method 12 of the present disclosure may be used as a micro or sub micro device. For example in one aspect the fluid-foil discs 14 may have a radius ranging from approximately 0.0000125 inches to 0.5 inches, the central intake 26 and/or exhaust 42 ranging from approximately 0.0000025 inches to 0.1 inches, with the fixed pitch 22 located variable lengths from the edge of the fluid-foil discs 14 with the fixed pitch 22 angle ranging from approximately 0.5° to 89.5°. The shroud 40 may have a radius covering the fluid-foil discs 14 to direct flow. The shroud 40 and leading edge 18 and/or trailing edge 24 of the fluid-foil discs 14 may be defined by a number of variations of the super ellipse function, complex parabolic functions or a simple parabola. The leading edge 18 and/or trailing edge 24 of the fluid-foil discs 14 may be at the fixed pitch 22. The applicable RPMs utilized may range from less than 100 to approximately 100,000 RPMs or greater. The boundary layer 23 thickness may range from approximately one micron to about 0.02 inches. Thickness of the boundary layer 23 may vary depending on the fluid medium and RPM range desired.

8. The fluid-foil impeller 10 and method 12 of the present disclosure may be used as an auxiliary marine propeller. In particular, the fluid-foil discs 14 may have a radius ranging from approximately 0.5 inches to 10 inches, the central intake 26 having a radius of approximately 0.25 inches to 5 inches, with the fixed pitch 22 located $\frac{1}{32}^{nd}$ inch to 2 inches from the edge of the fluid-foil discs 14 with the fixed pitch angle 22 ranging from approximately 30° to 60°. The shroud 40 may have a radius ranging from approximately 0.75 inches to 23 inches. The shroud 40 and leading edge 18 of the fluid-foil discs 14 may be defined by a number of variations of the super ellipse function. The trailing edge 24 of the fluid-foil discs 14 may be defined by a number of variations of complex parabolic functions or a simple parabola. The trailing edge 24 of the fluid-foil discs 14 may be at the fixed pitch 22. The applicable RPMs utilized may range from approximately 4,500 to 100,000. The boundary layer 23 thickness may range from approximately 0.031 inches to 0.37 inches.

9. The fluid-foil impeller 10 and method 12 of the present disclosure may be used as a marine propeller for a large ship or sailing vessel. In particular, the fluid-foil discs 14 may have a radius ranging from approximately 5 inches to 192 inches, the central intake 26 having a radius ranging from approximately 0.25 inches to 5 inches, with the fixed pitch 22 located $\frac{1}{32}^{nd}$ inch to about 2 inches from the edge of the fluid-foil discs 14 with the fixed pitch 22 angle ranging from approximately 30° to 60°. The shroud 40 may have a radius ranging from approximately 6 inches to 198 inches. The shroud 40 and leading edge 18 of the fluid-foil discs 14 may be defined by a number of variations of the super ellipse function. The trailing edge 24 of the fluid-foil discs 14 may be defined by a number of variations of complex parabolic functions or a simple parabola. The trailing edge 24 of the fluid-foil discs 14 may be at the fixed pitch 22. The applicable RPMs utilized may range from approximately 400 to 20,000 RPMs. The boundary layer 23 thickness may range from approximately 0.031 inches to 0.37 inches.

A general description of the present disclosure as well as preferred embodiments to the present disclosure has been set forth. Those skilled in the art to which the present disclosure pertains will recognize and be able to practice additional variations in the fluid-foil impeller 10 and method of use 12 described which fall within the teachings of this invention. It is contemplated that the fluid-foil impeller 10 and method of use 12 of the present disclosure may be utilized with all manner and manufacturers of engines, turbines, and motors in their respective industries of use. Accordingly, all such modifications and additions are deemed to be within the scope of the invention which is to be limited only by the issued claims.

What is claimed is:

1. A fluid-foil impeller, comprising:
a plurality of fluid-foil discs;
each fluid-foil disc comprising:
   a) a leading edge;
   b) a trailing edge;
   c) a chord separating the leading edge and the trailing edge;
   d) a fixed pitch;
the plurality of fluid-foil discs arranged in a series;
the series comprising at least one boundary layer located in between the fluid-foil discs of the plurality of fluid-foil discs arranged in the series;
at least one spacer forming the boundary layer;
at least one structural post connecting the plurality of fluid-foil discs; and
the at least one structural post mounted to a carrier;
wherein the carrier is coupled to a drive shaft that is configured to rotate the fluid-foil impeller to propel fluid.

2. The fluid-foil impeller of claim 1, further comprising:
a shroud;
the shroud having at least one intake;
the shroud having at least one exhaust;
the shroud configured to partially or fully encompass the fluid-foil impeller;
the shroud configured to divert fluid to the exhaust to expel fluid from the fluid-foil impeller.

3. The fluid-foil impeller of claim 2, further comprising at least one peripheral Venturi inlet integrated into the shroud and implementing a Venturi effect.

4. The fluid foil impeller of claim 3, wherein the carrier comprises:
a coupling connecting the carrier to the drive shaft of a powered device; and
wherein the coupling is recessed to achieve low turbulence while permitting fluid flow to be present at each fluid-foil disc of the series.

5. The fluid foil impeller of claim 4, wherein the carrier further comprises a balancing track configured to provide adaptive balancing to the fluid-foil impeller while the carrier is in motion.

6. The fluid foil impeller of claim 5, wherein the plurality of fluid-foil discs is mounted to the carrier via the at least one structural post.

7. The fluid-foil impeller of claim 6, wherein the leading edges and trailing edges of the plurality of fluid-foil discs may act interchangeably with regard to the direction of fluid-flow through the fluid-foil impeller and configured to manipulate fluid flow velocities.

8. The fluid-foil impeller of claim 7, wherein the thickness of the boundary layers between the plurality of fluid-foil discs in series vary depending on fluid viscosity, length of time within precise boundary layer regions and range of RPMs.

9. The fluid-foil impeller of claim 8, wherein size, mass and reinforcing of the plurality of fluid-foil discs in coordination with the leading edges and the trailing edges are configured to fluctuate innate torque values, RPM ranges and fluid viscoelastic manipulations.

10. The fluid foil impeller of claim 6, wherein the leading edges of the fluid-foil discs are configured to distribute fluid equally to both sides of the fluid-foil disc to provide for equal fluid reactions on each side of the fluid-foil disc.

11. The fluid-foil impeller of claim 10, wherein the chord is configured to accelerate a fluid to approach a rotational velocity of the fluid-foil impeller before reaching the fixed pitch whereby vectored propulsion ensues tangent to the fixed pitch at an angle, $\theta$.

12. The fluid-foil impeller of claim 11, wherein the trailing edges of the fluid-foil discs are configured to create a Kutta condition to avoid Coanda induced turbulence to mitigate cavitation of each fluid-foil disc during operation of the fluid-foil impeller.

13. The fluid-foil impeller of claim 12, wherein the chord of each fluid-foil disc of the plurality of fluid-foil discs arranged in the series may vary in thickness from an outer radius to an inner radius to form a variable thickness boundary layer.

14. The fluid-foil impeller of claim 12, wherein the chord of each fluid-foil disc of the plurality of fluid-foil discs arranged in the series is uniform in thickness from an outer radius to an inner radius to form a uniform thickness boundary layer.

15. A fluid-foil impeller, comprising:
a plurality of fluid-foil discs;
each fluid-foil disc comprising a fixed pitch;
the plurality of fluid-foil discs arranged in a series;
at least one spacer separating each fluid-foil disc of the plurality of fluid-foil discs arranged in the series;
at least one structural post connecting the plurality of fluid-foil discs; and
the at least one structural post mounted to a carrier.

16. The fluid-foil impeller of claim 15, further comprising a recessed coupling connecting the carrier to a drive shaft configured to rotate the fluid-foil impeller to propel fluid.

17. The fluid-foil impeller of claim 16, further comprising a shroud having at least one intake and at least one exhaust.

18. The fluid-foil impeller of claim 17, wherein each fluid-foil disc comprises:
   a) a leading edge;
   b) a trailing edge; and
   c) a chord separating the leading edge and the trailing edge.

19. The fluid-foil impeller of claim 18 configured to allow for fluid to flow in multiple directions through the impeller.

20. A method of using a fluid-foil impeller, comprising:
providing the fluid-foil impeller of claim 15; and
using the fluid-foil impeller in an industrial application.

\* \* \* \* \*